(12) United States Patent
Dong et al.

(10) Patent No.: US 7,280,730 B2
(45) Date of Patent: Oct. 9, 2007

(54) LARGE CORE HOLEY FIBERS

(75) Inventors: Liang Dong, Ann Arbor, MI (US); Donald J. Harter, Ann Arbor, MI (US); William Wong, Ann Arbor, MI (US)

(73) Assignee: Imra America, Inc., Ann Arbor, MI (US)

( * ) Notice: Subject to any disclaimer, the term of this patent is extended or adjusted under 35 U.S.C. 154(b) by 248 days.

(21) Appl. No.: 10/844,943

(22) Filed: May 13, 2004

(65) Prior Publication Data

US 2005/0157998 A1    Jul. 21, 2005

Related U.S. Application Data

(60) Provisional application No. 60/536,914, filed on Jan. 16, 2004.

(51) Int. Cl.
*G02B 6/02* (2006.01)
*G02B 6/26* (2006.01)

(52) U.S. Cl. .................. 385/126; 385/28; 385/123; 385/124; 385/127; 385/128

(58) Field of Classification Search ................ 385/124, 385/123, 126–128; 11/28
See application file for complete search history.

(56) References Cited

U.S. PATENT DOCUMENTS 6,334,019 B1 * 12/2001 Birks et al. .................. 385/125
6,795,635 B1 *  9/2004 Fajardo et al. .............. 385/140

OTHER PUBLICATIONS

Martinez, et al., *(E)ESI determination from mode-field diameter and refractive index profile measurements on single—mode fibres*, IEEE Proceedings, vol. 135, Pt. J., No. 3, Jun. 1988, pp. 202-210.

Knight, et al., *Properties of photonic crystal fiber and the effective index model*, vol. 15, No. 3, Mar. 1998, J. Opt. Soc. Am. A., pp. 748-752.

Mortensen, et al., *Modal cutoff and the V parameter in photonic crystal fibers*, Oct. 15, 2003, vol. 28, No. 20, Optics Letters, pp. 1879-1881.

Knight, et al., *All-silica single-mode optical fiber with photonic crystal cladding*, Oct. 1, 1996 / vol. 21, No. 19 / Optics Letters, pp. 1547-1549.

Birks, et al., *Endlessly single-mode photonic crystal fiber*, Jul. 1, 1997 / vol. 22, No. 13 / Optics Letters, pp. 961-963.

* cited by examiner

*Primary Examiner*—Frank G. Font
*Assistant Examiner*—Michael P. Mooney
(74) *Attorney, Agent, or Firm*—Knobbe, Martens, Olson & Bear, LLP

(57) ABSTRACT

Various types of holey fiber provide optical propagation. In various embodiments, for example, a large core holey fiber comprises a cladding region formed by large holes arranged in few layers. The number of layers or rows of holes about the large core can be used to coarse tune the leakage losses of the fundamental and higher modes of a signal, thereby allowing the non-fundamental modes to be substantially eliminated by leakage over a given length of fiber. Fine tuning of leakage losses can be performed by adjusting the hole dimension and/or the hole spacing to yield a desired operation with a desired leakage loss of the fundamental mode. Resulting holey fibers have a large hole dimension and spacing, and thus a large core, when compared to traditional fibers and conventional fibers that propagate a single mode. Other loss mechanisms, such as bend loss and modal spacing can be utilized for selected modes of operation of holey fibers. Other embodiments are also provided.

49 Claims, 20 Drawing Sheets

LARGE CORE HOLEY FIBERS

PRIORITY APPLICATION

This application claims the benefit of U.S. provisional application 60/536,914 filed Jan. 16, 2004 entitled "LARGE CORE HOLEY FIBERS" which is incorporated herein by reference in its entirety.

BACKGROUND

1. Field

The present teachings relate to optical fibers in general and in particular, to single-mode and multi-mode holey fibers having large core dimensions and devices and systems that use such fibers such as lasers and amplifiers.

2. Description of the Related Art

A holey fiber is an optical fiber where optical guidance is provided by an arrangement of "holes" disposed about a core. Such holes may have a refractive index lower than that of the core, and collectively form a cladding region having an effective refractive index also lower than that of the core.

More generally, holey fiber is used herein to refer to fiber comprising a plurality of cladding features, e.g., holes, disposed in a matrix, wherein the cladding features may have a refractive index different from that of the matrix. Accordingly, light incident on the cladding features may be reflected or scatter therefrom.

A photonic crystal fiber (PCF) is a holey fiber where the holes are arranged in a regular manner. In one arrangement, the cladding region can be formed by holes arranged in a hexagonal close-packing-like manner, and the core can be formed in the center area of such hexagonal patterned cladding region. The core can be in the center area where a center hole, and one or more inner "rings" of holes, would otherwise be located in the extended array of holes. PCFs formed in the foregoing manner thus have a core dimension and a cladding region thickness.

As with traditional fibers, sustained propagation of only a single mode in PCFs is desirable in many applications. Conventional PCFs operable in the single-mode propagation regime have core dimensions and cladding region thicknesses that resemble traditional non-holey single-mode fibers. One limitation of such single-mode traditional fibers and conventional PCFs is that the core dimension is limited to a relatively small value. In such small core fibers, high optical power levels result in peak intensities that induce non-linearities in the properties of the core and fiber. High power application of such fibers, therefore, is either not practical or not possible.

SUMMARY

In certain embodiments described herein, large core fibers for propagating single optical modes can be used in lasers and amplifiers and for other systems. One embodiment of the invention, for example, comprises an optical fiber for propagating a fundamental mode and suppressing higher order modes. The optical fiber comprises:

a cladding region comprising a plurality of cladding features disposed in a matrix, said plurality of cladding features having an average spacing, $\Lambda$, and an average size, d, said plurality of cladding features being substantially arranged in a plurality of rows, N; and a core region surrounded by said cladding region, said plurality of cladding features substantially confining propagation of said fundamental mode to said core region, said plurality of cladding features having (i) sufficient average spacing, $\Lambda$, to provide an increased effective core size, (ii) a sufficient average size, d, to provide substantial confinement of light within said core region, and (iii) an average number of rows, N, suitable to support propagation of said fundamental mode and suppress propagation of said plurality of higher order modes, wherein said average size, d, and said average spacing, $\Lambda$, have respective values that yield a ratio of $$\frac{d}{\Lambda}$$

that is at least about 0.35 to provide an increased effective core size and substantial confinement, and said average number of rows N is less than or equal to about 4 so as to provide single mode propagation.

Another embodiment of the invention comprises an optical fiber for propagating a single optical mode. The optical fiber comprises:

a cladding region comprising a plurality of cladding features disposed in a matrix, said plurality of cladding features having an average spacing, $\Lambda$, and an average size, d; and a core region surrounded by said cladding region, said plurality of cladding features substantially confining propagation of said single optical mode to said core region, said plurality of cladding features having (i) sufficient average spacing, $\Lambda$, to provide an increased effective core size, $2\rho$, and (ii) a sufficient average size, d, to provide substantial confinement of light within said core region, wherein said average size, d, and said average spacing, $\Lambda$, have values at least about 20 micrometers to provide an effective core size of at least about 20 micrometers.

Another embodiment of the invention comprises an optical fiber for propagating a fundamental mode and suppressing higher order modes. The optical fiber comprises:

a cladding region comprising a plurality of cladding features disposed in a matrix, said plurality of cladding features having an average spacing, $\Lambda$, and an average size, d, said plurality of cladding features arranged over a portion of said matrix having an average thickness, t; and a core region surrounded by said cladding region, said plurality of cladding features substantially confining propagation of said fundamental mode to said core region, said plurality of cladding features having (i) sufficient average spacing, $\Lambda$, to provide an increased effective core size and (ii) sufficient average size, d, to provide substantial confinement of light within said core region, and (iii) said portion of said matrix including said cladding features having suitable average thickness, t, to support propagation of said fundamental mode and suppress propagation of said plurality of higher order modes, wherein said average size, d, and said average spacing, $\Lambda$, have respective values that yield a ratio of $$\frac{d}{\Lambda}$$

that is at least about 0.4 so as to provide an increased effective core and substantial confinement, and said average thickness is less than or equal to about d+3$\Lambda$ so as to provide single mode propagation.

Another embodiment of the invention comprises an optical fiber for propagating a single optical mode. The optical fiber comprises:

a cladding region comprising a plurality of cladding features disposed in a matrix, said plurality of cladding features having an average spacing, Λ, and an average size, d; and a core region surrounded by said cladding region, said plurality of cladding features substantially confining propagation of said single optical mode to said core region, said plurality of cladding features having (i) sufficient average spacing, Λ, to provide an increased effective core size, 2ρ, and (ii) a sufficient average size, d, to provide substantial confinement of light within said core region, wherein said average size, d, and said average spacing, Λ, have respective values that provide an effective core size of at least about 40 micrometers.

Another embodiment of the invention comprises an optical fiber for propagating a single optical mode. The optical fiber comprises:

a cladding region comprising a plurality of cladding features disposed in a matrix, said plurality of cladding features having an average spacing, Λ, and an average size, d; and a core region surrounded by said cladding region, said plurality of cladding features substantially confining propagation of said single optical mode to said core region, said plurality of cladding features having (i) sufficient average spacing, Λ, to provide an increased effective core size, 2ρ, and (ii) a sufficient average size, d, to provide substantial confinement of light within said core region, wherein said average size, d, is substantially equal to said average spacing, Λ.

Another embodiment of the invention comprises an optical fiber for propagating a single mode. The optical fiber comprising:

a cladding region comprising a plurality of cladding features disposed in a matrix, said plurality of cladding features having an average spacing, Λ, and an average size, d; and a core region surrounded by said cladding region, said plurality of cladding features substantially confining propagation of said single mode to said core region, said plurality of cladding features having (i) sufficient average spacing, Λ, to provide an increased effective core size, 2ρ, and (ii) a sufficient average size, d, to provide substantial confinement of light within said core region, wherein the difference between said average size, d, and said average spacing, Λ, is less than about 50% of said average spacing, Λ.

Another embodiment of the invention comprises an optical fiber assembly comprising an optical fiber that supports a fundamental mode having a fundamental mode profile and a plurality of higher order modes having different mode profiles. The optical fiber assembly comprises:

a cladding region comprising a plurality of cladding features disposed in a matrix;

a core region surrounded by said cladding region, said plurality of cladding features substantially confining propagation of light to said core region, said core region being sufficiently large so as to support propagation of said fundamental optical mode and said plurality of higher order modes; and an optical coupler disposed with respect to said core region to couple light into said core region, said optical coupler configured to output light having an optical distribution substantially matching the mode profile of said fundamental mode, thereby coupling substantially more of said light into said signal mode of said fiber than said plurality of higher order modes.

Another embodiment of the invention comprises a method of propagating light through an optical fiber that supports a fundamental optical mode and a plurality of higher order modes. The fundamental mode has a mode profile with a spatial distribution. The method comprises:

coupling light into a core region of an optical fiber, said core region surrounded by a cladding region comprising a plurality of cladding features disposed in a matrix; and propagating said light along said core region, substantially confining said propagation of said light along said core region with said plurality of cladding features forming said cladding region, wherein substantially more of said light is coupled into said fundamental mode of said fiber than said plurality of higher order modes.

Another embodiment of the invention comprises a hollow core photonic band gap fiber that provides optical amplification. The hollow core photonic band gap fiber comprises:

a cladding region comprising a plurality of cladding features disposed in a matrix;

a hollow core region surrounded by said cladding region, said hollow core having a hollow region formed therein, said plurality of cladding features arranged to form a photonic band gap to substantially confine propagation of light in said hollow core region; and a gain region having optical gain that is disposed proximal to said hollow region such that said light propagating through said hollow core region is amplified by said gain provided by said gain region.

Another embodiment of the invention comprises an optical fiber comprising:

a cladding region comprising a plurality of cladding features disposed in a matrix, said plurality of cladding features having an average spacing, Λ, and an average size, d, said plurality of cladding features being substantially arranged in a plurality of rows, N;

a core region surrounded by said cladding region, said plurality of cladding features substantially confining propagation of said light in said core region, said plurality of cladding features having an average spacing, Λ, and a average size, d, and an average number of rows to support propagation of a fundamental mode and a plurality of higher order modes; and at least one mode filter that suppresses higher order modes by introducing substantially greater loss to said higher order modes than to said fundamental modes such said fundamental mode dominates while said higher order modes are quenched.

The optical fiber described herein can be used for many applications. The optical fiber may be used for example as gain fiber and may be employed in lasers and amplifiers including fiber lasers and fiber amplifiers. Other uses are possible.

For example, another embodiment of the invention comprises an optical fiber amplifier comprising:

an optical gain fiber for propagating a single mode, said optical gain fiber providing optical gain, said optical gain fiber comprising:

(i) a cladding region comprising a plurality of cladding features disposed in a matrix, said plurality of cladding features having an average spacing, Λ, and an average size, d; and (ii) a core region surrounded by said cladding region, said plurality of cladding features substantially confining propagation of said single mode to said core region, said plurality of cladding features having (i) sufficient average spacing, Λ, to provide an increased effective core size, 2ρ, and (ii) a sufficient average size, d, to provide substantial confinement of light within said core region, wherein the difference between said average size, d, and said average spacing, Λ, is less than about 50% of said average spacing, Λ.

Another embodiment of the invention comprises an optical fiber amplifier comprising:

an optical pump source; and an optical gain fiber optical fiber for propagating a single optical mode, said optical gain fiber providing optical gain, said optical gain fiber comprising:

(i) a cladding region comprising a plurality of cladding features disposed in a matrix, said plurality of cladding features having an average spacing, Λ, and an average size, d; and (ii) a core region surrounded by said cladding region, said plurality of cladding features substantially confining propagation of said single optical mode to said core region, said plurality of cladding features having (i) sufficient average spacing, Λ, to provide an increased effective core size, 2ρ, and (ii) a sufficient average size, d, to provide substantial confinement of light within said core region, wherein said average size, d, is substantially equal to said average spacing, Λ.

Another embodiment of the invention comprises a CW fiber laser comprising:

a resonant cavity formed by at least partially reflective surfaces; and an optical fiber in said resonant cavity, said optical fiber having optical gain, said optical fiber propagating a single optical mode, said optical fiber comprising:

(i) a cladding region comprising a plurality of cladding features disposed in a matrix, said plurality of cladding features having an average spacing, Λ, and an average size, d; and (ii) a core region surrounded by said cladding region, said plurality of cladding features substantially confining propagation of said single optical mode to said core region, said plurality of cladding features having (i) sufficient average spacing, Λ, to provide an increased effective core size, 2ρ, and (ii) a sufficient average size, d, to provide substantial confinement of light within said core region, wherein said average size, d, and said average spacing, Λ, have values at least about 20 micrometers to provide an effective core size of at least about 20 micrometers.

Other embodiments are possible.

DETAILED DESCRIPTION OF SOME EMBODIMENTS

Figure 1A:
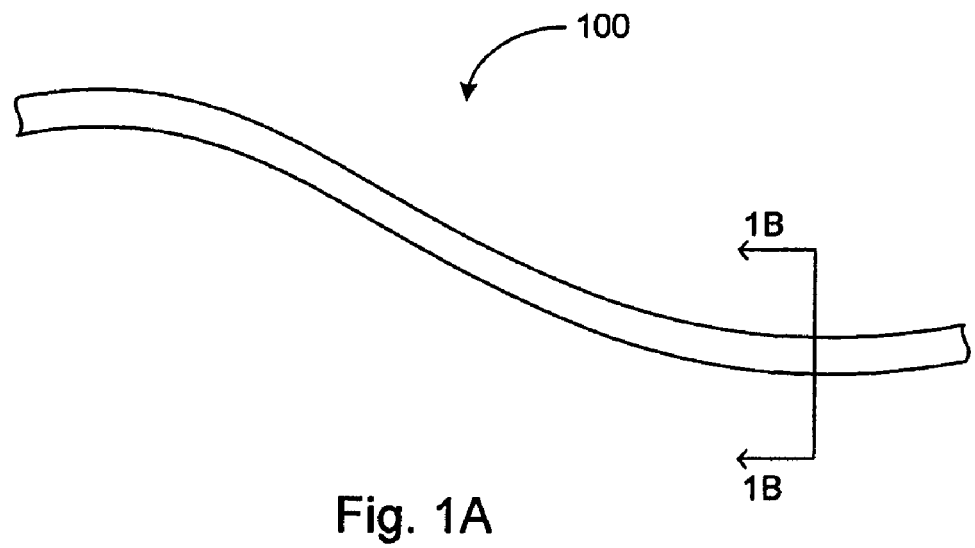
FIGS. 1A and B schematically illustrate an exemplary holey fiber having a cladding region defined by a plurality of "holes" or cladding features that facilitates propagation of only a single optical mode through a relatively large core.

These and other aspects, advantages, and novel features of the present teachings are apparent from the following detailed description and the accompanying drawings. In the drawings, similar elements have similar reference numerals.

The present teachings generally relate to holey fibers, photonic crystal fibers, and photonic bandgap fiber. For the purpose of description herein, and in accordance with current usage of terms of art, a holey fiber is an optical fiber where optical guidance is essentially provided by a regularly or irregularly arranged cladding features or "holes." As used herein, holes refers to features disposed in a matrix material having different optical properties such as index of refraction in comparison to the matrix material. The holes can be open, evacuated, or filled with air, gas, liquid, or may comprise other material, transparent or non-transparent, such as for example glass, polymer, or other substance or material. A photonic crystal fiber (PCF) is a holey fiber with substantially regular arrangement holes. A photonic bandgap fiber (PBF) is a PCF with appropriate spacing and arrangement of the holes or cladding features that satisfies the Bragg condition at the wavelength of operation, and essentially provides optical guidance by photonic bandgap effects.

Figure 1B:
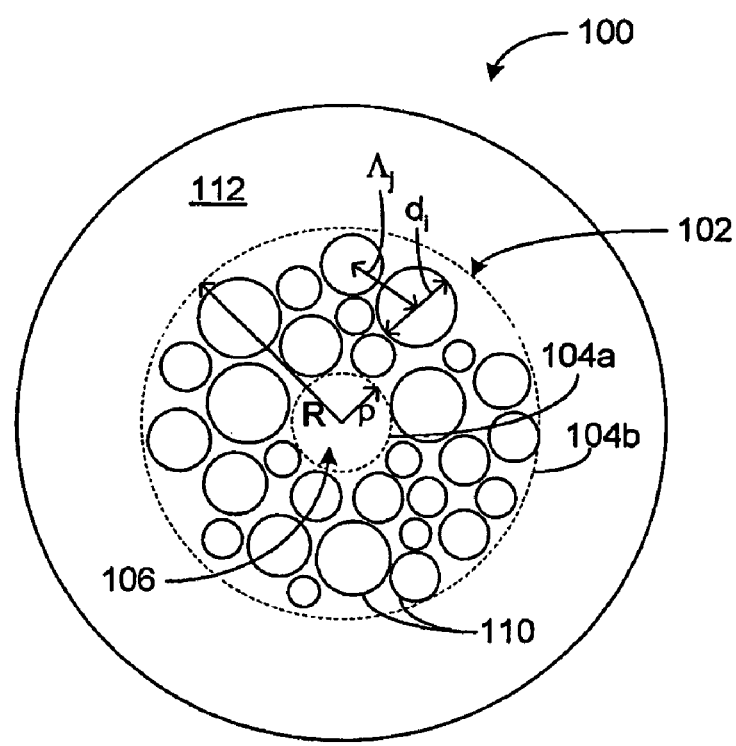

FIG. 1A shows a segment of a holey fiber 100, while FIG. 1B schematically illustrates an exemplary cross-section of the holey fiber 100 across the line 1B-1B. As the cross-section shows, the holey fiber 100 comprises a cladding region 102 that can be defined by a ring-like or annular region having an average inner radius $\rho$ and an average outer radius R. The cladding region 102 comprises a plurality of holes or cladding features 110.

The inner radius $\rho$ further defines a core 106 of the holey fiber 100. The core 106 may or may not be formed from same material as that of an outer region 112 and/or spaces between the holes 110 (the matrix in which the holes are formed). In various embodiments, the core 106, spaces between the holes 110, and the outer region 112 are formed from glass having a first refractive index $n_1$.

In certain embodiments, the holes 110 can be formed from materials having a second refractive index $n_2$ less than $n_1$, including but not limited to vacuum, a gas, a mixture of gases, a second type of glass, or other solid or liquid material. (By contrast, various embodiments of photonic band gap fiber may comprise holes or cladding features 110 that are formed from materials having a second refractive index $n_2$ greater than the index of refraction of the core 106 or surrounding matrix.) As depicted in FIG. 1B, the holes 110 may have different dimensions (exemplified by a dimension $d_i$). Furthermore, spacings between the holes 110 may be different (exemplified by a spacing $\Lambda_j$). Moreover, although the holes 110 are depicted as being round, other non-round holes may also be used.

One aspect of the present teachings relates to selectively manipulating a parameter or some combination of parameters such as the cladding region's effective thickness (R-$\rho$), average hole size (d), average hole spacing ($\Lambda$), and hole composition. As described above, the holes may be formed from different material. For the purpose of portions of this description, it will be assumed that the holes have a refractive index that is less than that of the core although the holes need not be so limited and may have a greater index of refraction as described above. By manipulating the foregoing properties of a holey fiber, one can selectively control the leakage losses of the different modes of an optical signal propagating through the core. For example, in various embodiments, one mode is propagated with a substantially smaller leakage loss while substantially all other modes propagate with substantially larger leakage losses.

As used herein, single mode and multimode fiber are defined consistently with the definitions used for traditional non-holey fiber. For traditional fibers, single mode and multimode fiber are generally defined in terms of V number, which is equal to π (numerical aperture) (core diameter)/wavelength for step index fibers. For non-step index fibers, numerical aperture and core diameter can be calculated with the equivalent values for step index fibers [see, e.g., Martinez, F., Husey, C. D., "(E)ESI determination from mode-field diameter and refractive index profile measurements on single-mode fibers" IEEE Proceedings V135, pp. 202-210, (1988)]. For fibers satisfying the relationship V<2.4, the power of the fundamental mode is significantly larger than the optical power of the next higher mode. Alternatively, for fibers wherein V>2.4, at least the next mode above the fundamental mode can have significant power in comparison to the fundamental mode. Single mode and multimode traditional fibers are accordingly specifically defined by the relationships V<2.4 and V>2.4, respectively. V=2.4 is the cut-off for the propagation of any mode but the lowest order mode.

In holey fibers, the numerical aperture can be found by the difference in refractive index of core and cladding. However, a core diameter that is the equivalent value for step index fibers is difficult to calculate. Various references [see, e.g., (1) Knight et al, "Properties of photonic crystal fiber and the effective index model" J. Opt. Soc. Am. A Vo. 15, pp.748-752, (1998), and (2) Mortensen et al "Modal cutoff and the V parameter in photonic crystal fibers" Opt. Lett. V. 28, pp. 1879-1881, (2003)] report that if the core diameter is made equal to the pitch or the distance between holes, $\Lambda$, then the V for cut off for the propagation of any mode other than the single mode is 2.5 (see, e.g., Knight et al) and π (see, e.g., Mortensen et al). For the various embodiments described herein, whether the V cut-off is 2.405, 2.5 or π is not critical. Various embodiments of holey fiber described herein have a much larger core radius than possible with conventional optical fiber that supports propagation of a single optical mode. Therefore, we will utilize the recent research in this technical area where multimode fiber is defined as where V>π and the core diameter is made equal to the pitch or average pitch to the fiber. Conversely, single mode fiber is defined herein as fiber where V<π.

As described above, holey fiber may be designed to introduce loss for specific modes. The hole size, spacing, and the number of holes may, for example, be selected to induce loss in the propagation of higher order modes in a multimode fiber where V>π. With a decrease of the number of holes, light in the higher order modes may not be confined to the core and may escape from the fiber. Such loss introduced into multimode fiber (V>π) is analogous to traditional non-holey multimode fiber having a V number larger than π that include mode filtering provided, for example, by bending the fiber to introduce loss in the propagation of higher order modes. (Mode filters are described in, e.g., U.S. Pat. No. 5,818,630 issued to Fermann et al on Oct. 6, 1998 and entitled "Single-mode Amplifier and Compressors Based on Multi-mode Fibers," which is hereby incorporated herein by reference.) Sufficient bending can be applied to induce losses for each of the modes higher than the fundamental mode such that the fundamental mode is the sole mode that propagates through the bent multimode fiber. Similarly, multimode holey fiber having a V number larger than about π may have a design that introduces loss to higher order modes so that propagation of these higher order modes is attenuated.

Figure 2A:
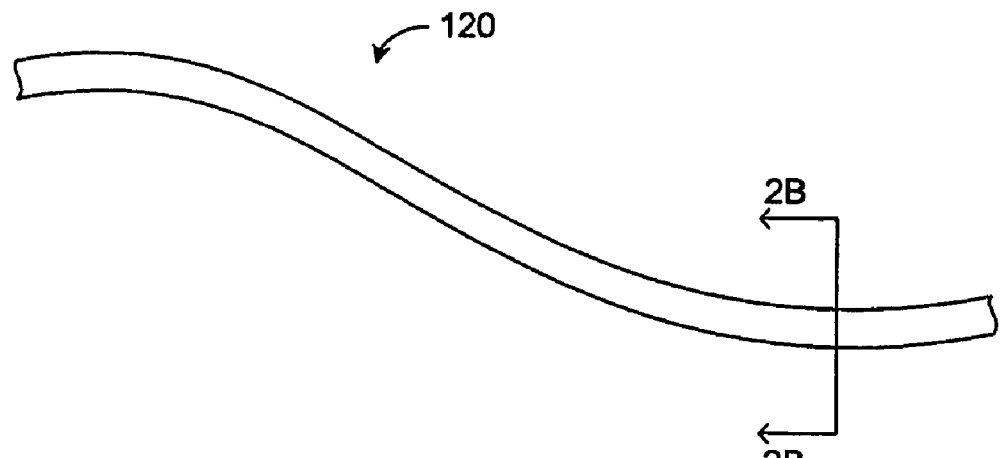
FIGS. 2A and B schematically illustrate one embodiment of a photonic crystal fiber (PCF) having a plurality of holes or cladding features arranged in a two-dimensional representation of an exemplary simple cubic array, wherein the dimension of the holes, spacing between the holes, number of layers or rows of holes, and/or composition of the holes can be varied to allow propagation of only a single optical mode in a relatively large core.

FIGS. 2A and B, and subsequent figures depict various holey fibers having regularly spaced holes in various configurations. Thus, these holey fibers are now referred to as PCFs (photonic crystal fibers) in accordance with the definition set forth above. It will be understood that unless stated otherwise, concepts disclosed in reference to various PCFs are also applicable to a periodic structure such as for example the exemplary holey fiber described above in reference to FIGS. 1A and B as well as asymmetric and other structures having varying degrees of order. Furthermore, the various geometric arrangements of holes in the PCFs herein are exemplary, and should not be construed to limit the scope of the present teachings as a wide range of variations in configurations, arrangements, and feature characteristics are possible.

Figure 2B:
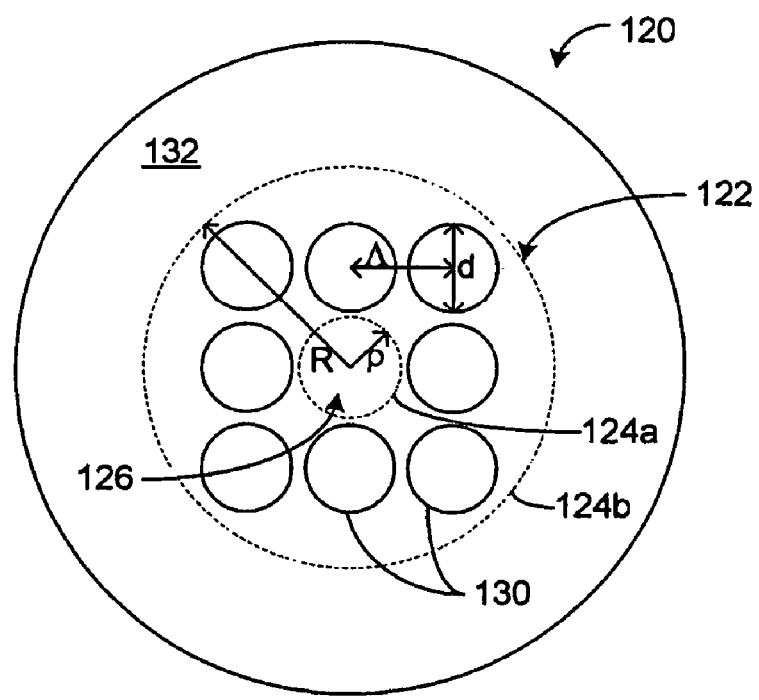

FIGS. 2A and B illustrate an exemplary PCF 120 having a plurality of holes 130 arranged in a two-dimensional representation of a simple cubic array. A core 126 may be defined by a region devoid of holes that is created by the absence of a center hole (removed in FIG. 2B) in the simple cubic array. Accordingly, a measure of the core size is 2ρ, which corresponds to the diameter of the central hole absent from the array. An exemplary one-layer cladding region 122 can be located between, e.g., an inner ring 124a (radius ρ) and an outer ring 124b (radius R) that surrounds the first layer of holes 130. More layer(s) of holes can be arranged beyond the first layer shown in FIG. 2B. Furthermore, a core can be altered by removing more than the center hole (in which case, number of rows or layers in the array would otherwise be greater than one).

The exemplary cladding region 122 provides the core 126 whose diameter 2ρ is comparable to hole dimension d and hole spacing Λ. By selecting a relatively large hole dimension, and thereby a relatively hole spacing, the corresponding core diameter can be relatively large. Propagation of only a single optical mode can be achieved by selectively adjusting the values of d, Λ, and/or the number of layers.

Figure 3A:
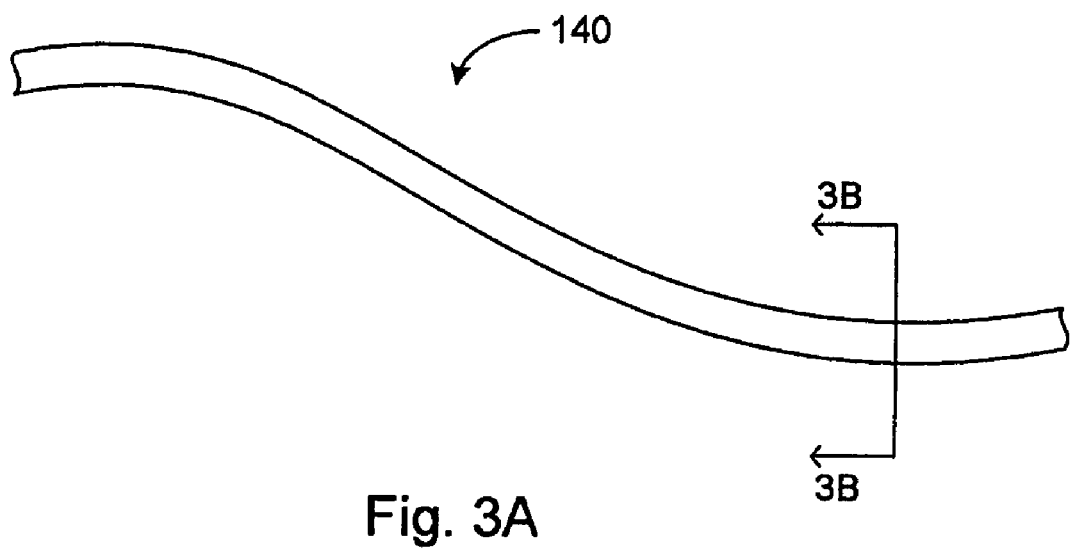
FIGS. 3A and B schematically illustrate one embodiment of a PCF having a plurality of holes or cladding features arranged in a two-dimensional representation of an exemplary hexagonally close-packed array, wherein the dimension of the holes, spacing between the holes, number of layers or rows of holes, and/or composition of the holes can be varied to allow propagation of a single optical mode through a relatively large core.

FIGS. 3A and B illustrate an exemplary PCF 140 having a plurality of holes 150 arranged in a two-dimensional representation of an exemplary hexagonal close-packed type array. A core 146 may comprise a region that overlaps with an absent center hole removed in FIG. 3B and from the hexagonal array. A first layer 142 comprises six holes 150 arranged in a hexagonal manner, and defines the core 146 having a radius ρ. As described below, more layer(s) or rows of holes can be arranged beyond the first layer 142 shown in FIG. 3B. Furthermore, a core can be defined by removing more than the center hole (in which case, the number of layers or rows in the array would otherwise be greater than one).

The exemplary cladding region 142 provides the core 146 whose diameter 2ρ is generally comparable to hole dimension d and hole spacing Λ. By selecting a relatively large hole dimension, and thereby a relatively large hole spacing, the corresponding core diameter can be relatively large. Single-mode propagation, propagation of only a single optical mode to the exclusion of sustained propagation of higher order modes, can be achieved by selectively adjusting the values of d, Λ, and/or the number of layers.

Figure 3B:
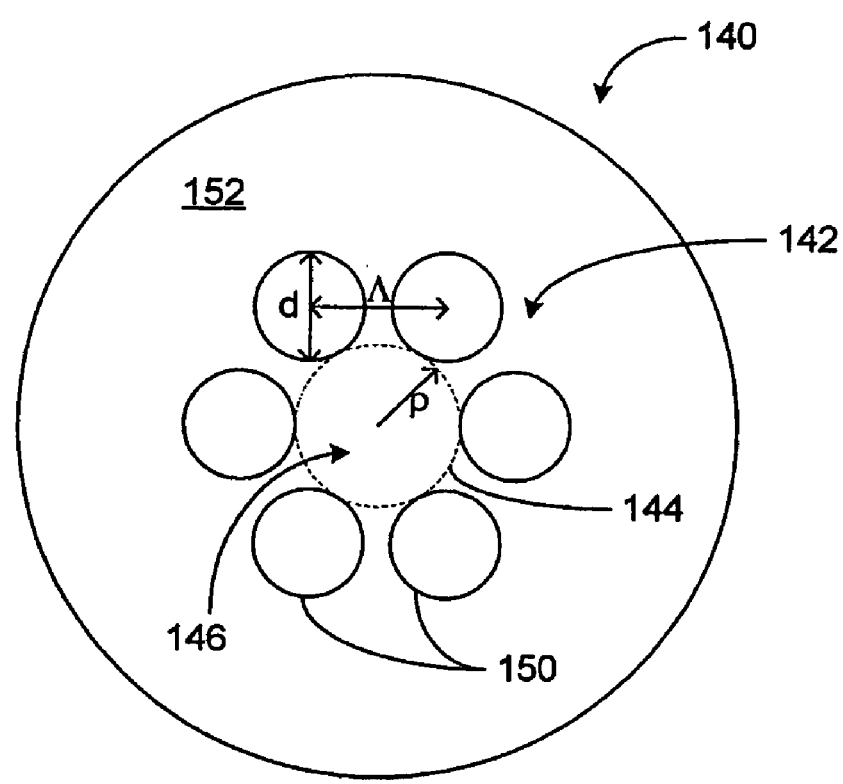

The exemplary fiber illustrated in FIG. 3B, and other holey fibers disclosed herein, can be formed, for example, by stacking of glass capillaries to construct a preform. One or more capillaries in the center may be replaced by glass rod/rods to form the core. In some embodiments as described below, the core-forming rod(s) can be doped with rare earth ions to provide a gain media. The preform can then be drawn on a conventional fiber-drawing tower into fibers with similar cross-section. Other methods of forming holey fiber may be employed as well.

In one embodiment, the large core design disclosed herein has a substantially uniform refractive index distribution, especially over the core and preferably over the cross-section of the fiber (in the cladding region, gap areas between the holes). When the core diameter is in the range of approximately 40 to 100 μm (such as those disclosed herein), this uniformity becomes increasingly important to substantially eliminate any local waveguide effects within the core of the fiber.

Figure 4A:
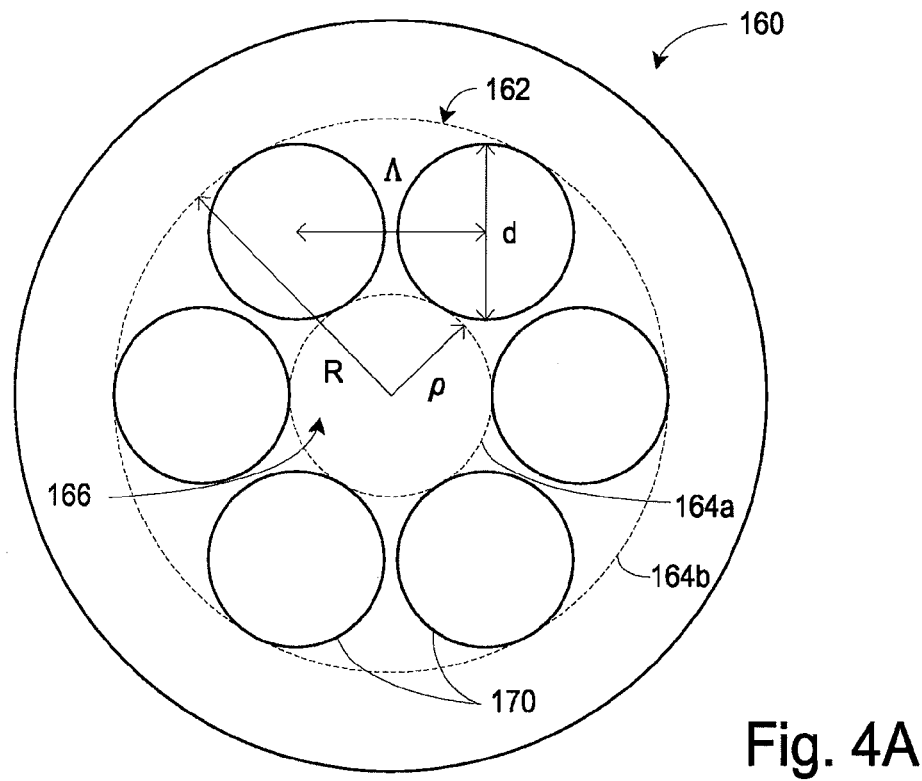
FIGS. 4A-C schematically illustrate various embodiments of the hexagonally close-packed array of FIGS. 3A and B, showing different numbers of "rings" (i.e., rows or layers) of holes/cladding features distributed in an array about a relatively large core, wherein the number of rings can be used to affect the leakage losses of various optical modes of an optical signal.
Figure 4B:
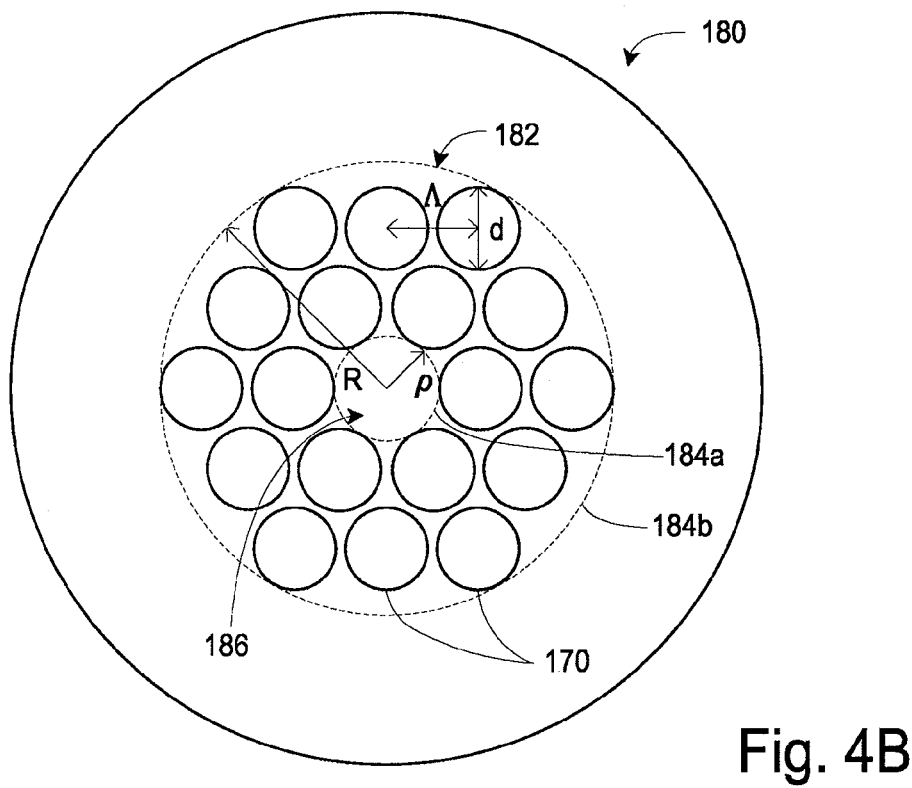
Figure 4C:
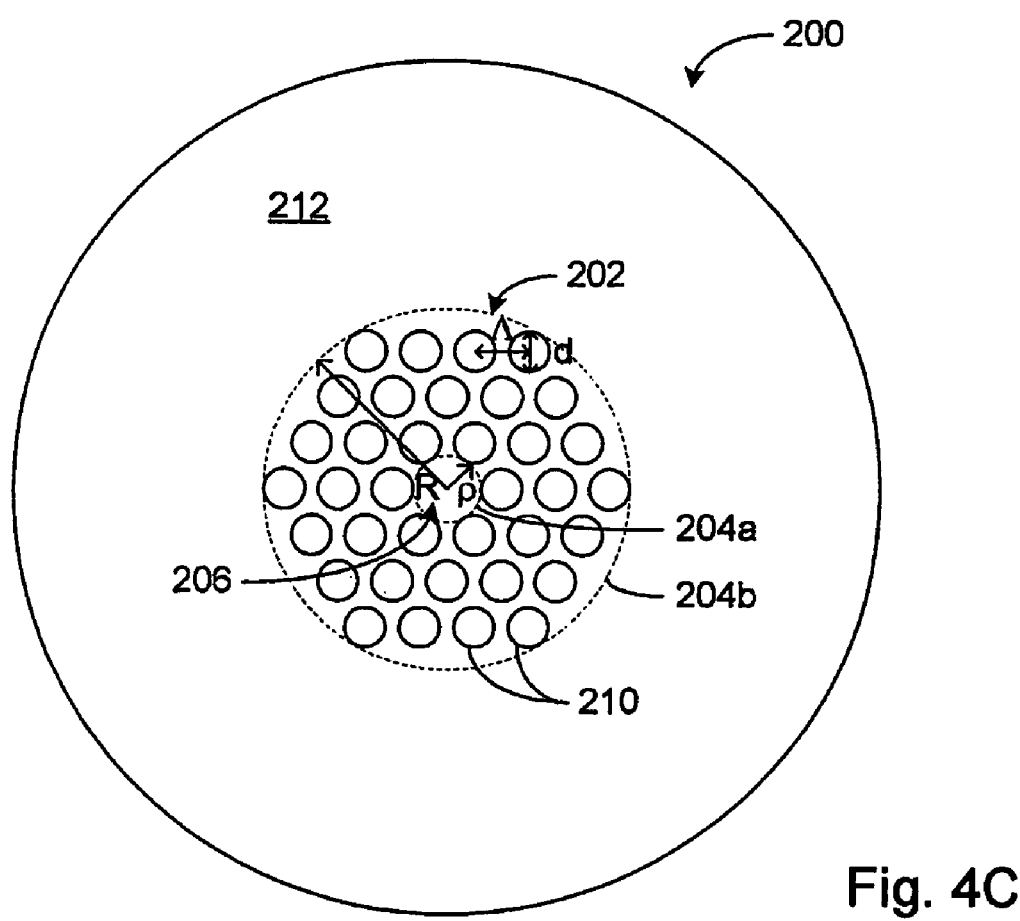

FIGS. 4A-C now illustrate various embodiments of a PCF having cladding regions formed by hexagonally arranged holes or cladding features. In the exemplary PCFs shown in FIGS. 4A-C, core dimensions are comparable to hole spacings and hole dimensions. Thus, by selecting a relatively large hole size and spacing, a relatively large core dimension can be achieved.

One way to design such a relatively large core is to begin by determining the desired dimension of the core. Then, a hexagonally close-packed array of holes or cladding features can be arranged where the hole diameter d is substantially equal to the hole spacing Λ. To create a core, the center hole (and possibly more holes about the center hole) can be removed. The resulting "cladding" region comprises one or more rings or rows of close-packed holes, with the adjacent holes substantially close or touching. Because such close-packing may reduce leakage of higher order modes, leakage "paths" may be provided and leakage enhanced by reducing the hole dimension, increasing the hole spacing, or some combination thereof, such that, for example, the adjacent holes are no longer touching or as close together.

FIG. 4A illustrates one embodiment of a PCF 160 having a cladding region 162 formed by one layer or row (N=1) of holes 170. An inner portion 164a of the cladding region 162 generally defines a core 166 having a radius of ρ, and an outer portion 164b of the cladding region 162 has an outer diameter R. In the PCF 160 depicted in FIG. 4A, the hole diameter d is less than the hole spacing Λ. In one embodiment of an N=1 PCF, the hole diameter d is approximately 75 μm, and the hole spacing Λ is approximately 80 μm, resulting in the core diameter 2ρ (=2Λ−d) that is approximately 85 μm.

FIG. 4B illustrates one embodiment of a PCF 180 having a cladding region 182 formed by two layers or row (N=2) of holes 170. An inner portion 184a of the cladding region 182 generally defines a core 186 having a radius of ρ, and an outer portion 184b of the cladding region 182 has an outer diameter R. In the PCF 180 depicted in FIG. 4B, the hole diameter d is less than the hole spacing Λ. In one embodiment of an N=2 PCF, the hole diameter d is approximately 35 μm, and the hole spacing Λ is approximately 40 μm, resulting in the core diameter 2ρ (=2Λ−d) that is approximately 45 μm.

FIG. 4C illustrates one embodiment of a PCF 200 having a cladding region 202 formed by three layers (N=3) of holes 210. An inner portion 204a of the cladding region 202 generally defines a core 206 having a radius of ρ, and an outer portion 204b of the cladding region 202 has an outer diameter R. In the PCF 200 depicted in FIG. 4C, the hole diameter d is less than the hole spacing Λ. In one embodiment of an N=3 PCF, the hole diameter d is approximately 15 µm, and the hole spacing Λ is approximately 20 µm, resulting in the core diameter 2ρ (=2Λ−d) that is approximately 25 µm.

Table 1, shown below, summarizes various properties of the PCFs described above in reference to FIGS. 4A to 4C, in comparison with various conventional PCFs described in Philip Russell: "Photonic crystal fibers," Science, vol. 299, p. 358-62, 2003, Bouwmans et al.: "High-power Er:Yb fiber laser with very high numerical aperture pump-cladding waveguide," Applied Physics Letters, vol. 83, p. 817-18, 2003, Furusawa et al.: "Cladding pumped Ytterbium-doped fiber laser with holey inner and outer cladding," Optics Express, vol. 9, p. 714-20, 2001, and Wadsworth et al.: "High power air clad photonic crystal fiber laser," Optics Express, vol. 11, p. 48-53, 2003. In this table, the "Modes Propagated" is either single-mode (SM) or multi-mode (MM) corresponding to whether only propagation of a single optical mode is supported or whether multiple optical modes are propagated through the fiber, N corresponds to the number of rings or row (layers), d is the hole diameter, Λ is the hole spacing, 2ρ is a measure of the core diameter approximately equal to 2Λ−d for cases where the core corresponds to a single removed center hole of a hexagonally close-packed array, λ is the operating vacuum wavelength, Δn is the modal spacing (both measured and calculated), NA is the numerical aperture (measured and calculated), and V is the normalized frequency parameter that can be expressed as $(2\rho)(NA)\pi/\lambda$. Reference [1] corresponds to Philip Russell: "Photonic crystal fibers," Science, vol. 299, p. 358-62, 2003; reference [2] corresponds to Bouwmans et al.: "High-power Er:Yb fiber laser with very high numerical aperture pump-cladding waveguide," Applied Physics Letters, vol. 83, p. 817-18, 2003; reference [4] corresponds to Furusawa et al.: "Cladding pumped Ytterbium-doped fiber laser with holey inner and outer cladding," Optics Express, vol. 9, p. 714-20, 2001; and reference [5] corresponds to Wadsworth et al.: "High power air clad photonic crystal fiber laser," Optics Express, vol. 11, p. 48-53, 2003, each of which are hereby incorporated herein by reference in their entirety.

From Table 1, one can see that the conventional single-mode PCFs have a relatively small value of d/Λ, which corresponds to a relatively small core size. Furthermore, their cladding region includes a relatively large number of rows or layers of holes. Thus, the cladding region in these conventional PCFs that propagate a single optical mode generally resembles the cladding (e.g., a glass with slightly lower refractive index) of a traditional non-holey single-mode fiber.

Table 1 further shows details of two exemplary large core PCFs that propagate only a single optical mode, denoted as "FIG. 4B" and "FIG. 4A" in the reference column. These two PCFs incorporate various designs and techniques described herein. Some techniques described below were used to obtain the numerical simulation for these two exemplary PCFs.

The measured index difference $\Delta n_{meas}$ can be derived from the measured numerical aperture (NA) of the fiber output. The precision of such measurement can be less than ideal. Since this value is a useful parameter for comparison, the index difference was calculated for each case from the given d and Λ. These calculated values may be more accurate than those obtained by direct measurement.

TABLE 1

| Ref. | Modes Propagated | N | d (µm) | Λ (µm) | d/Λ | 2ρ (µm) | λ (µm) | $\Delta n_{meas}$ ($\Delta n_{cal}$) | $NA_{meas}$ ($NA_{cal}$) | $V_{meas}$ ($V_{cal}$) |
|---|---|---|---|---|---|---|---|---|---|---|
| [1] | SM | 5 | 2.7 | 9.7 | 0.3 | 16.7 | 1.06 | 0.0008 (0.00088) | 0.048 (0.0505) | 2.38 (2.50) |
| [2] | SM | 4 | 2.65 | 8.8 | 0.3 | 15 | 1 | 0.0042 (0.001) | 0.11 (0.054) | 5.2 (2.58) |
| [2] | MM | 4 | 5.7 | 10.4 | 0.55 | 15 | 1 | N/A (0.0021) | 0.056 (0.078) | N/A (3.67) |
| [4] | SM | 6 | 2 | 11.5 | 0.18 | 28 | 1.07 | 0.00086 (0.00042) | 0.05 (0.035) | 4.1 (2.87) |
| [5] | MM | 3-4 | 9 | 12 | 0.75 | 17 | 1.06 | 0.0017 (0.0051) | 0.07 (0.12) | 3.5 (6.13) |
| FIG. 4C | SM | 3 | 15 | 20 | 0.75 | 25 | — | — | — | — |
| FIG. 4B | SM | 2 | 35 | 40 | 0.875 | 45 | 1.55 | N/A (0.0025) | N/A (0.0854) | N/A (7.8) |
| FIG. 4A | SM | 1 | 75 | 80 | 0.938 | 85 | 1.55 | N/A (0.001106) | N/A (0.0566) | N/A (9.75) |

The calculated $\Delta n_{cal}$ can be obtained by first calculating the equivalent cladding index, which is the effective fundamental mode index of a structure which has the basic unit cell of the cladding extending infinitely in all directions. This calculation was performed with a finite element model with sufficient resolution for each case. The value of $\Delta n_{cal}$ is then determined by computing the difference of the glass refractive index and the equivalent cladding index.

As stated above, 2ρ is a measure of the equivalent core diameter and is taken to be 2Λ−d where a single hole (e.g., removed rod) forms the core. For cases where three absent rods or three holes form the core, the value of the core diameter can be obtained, e.g., from Mortensen et al: "Improved large-mode-area endlessly single-mode photonic crystal fibers", Optics Letters, vol. 28, pp. 393-395, 2003.

As stated above in reference to Table 1, the V parameter is the normalized frequency parameter (also referred to as V number) that can be approximated as $(2\rho)(NA)\pi/\lambda$. $V_{meas}$ and $V_{cal}$ correspond to measured and calculated V values respectively. In a traditional fiber, V<2.405 corresponds to the region of single mode fiber. As seen in Table 1, for all of the PCFs in the top five rows that support only single mode propagation, the calculate V numbers are less than 2.405 ($V_{cal}$<2.405), or very close to it. In contrast, the calculated V numbers for the N=2 (FIG. 4B) and N=1 (FIG. 4A), which are based on designs and techniques described herein and where propagation of only a single optical mode is supported, are 7.8 and 9.75 respectively. Such large V values would be associated with multi-mode fiber for a traditional non-holey optical fiber as well as multi-mode propagation in conventional PCFs.

In all of the single-mode PCFs in the first five rows of Table 1, $d/\Lambda<0.6$, whereas the N=2 and N=1 embodiments of PCFs based on designs and techniques described herein have $d/\Lambda>0.6$. The relative hole diameter of these PCFs described herein are thus much larger than that of conventional PCFs. In some embodiments, the fiber comprises a large $\Lambda$ for large core diameter and $\lambda/\Lambda<0.3$. The hole size d in such a region of interest may additionally be very large in comparison to wavelength $\lambda$ and to the gaps (glass matrix region, for example) between holes or scatter features.

In one possible region of operation as described above, single mode operation (where only a single optical mode is supported and higher order modes are suppressed) can be achieved. High leakage loss is provided for higher order modes while the fundamental mode leakage loss is kept very low. A PCF can be designed to allow a substantial power leakage over the device length for the higher order modes, while maintaining an acceptably low transmission loss for the fundamental mode. Some possible ways of optimizing the leakage losses by adjusting the number of layers of holes (N) and the hole properties are described below in greater detail.

For the large-core single-mode PCFs incorporating the designs and techniques described herein, a preferred region of operation is $d/\Lambda \geq 0.35$ with $N \leq 3$. More preferably, $d/\Lambda \geq 0.4$ or $d/\Lambda \geq 0.6$. Even more preferably, $d/\Lambda \geq 0.75$. The core sizes may be between about 20 to 300 micrometers or more preferably between about 30 to 150 micrometers. In some exemplary embodiments of holey fiber or PCF, $d/\Lambda>0.6$, $N \leq 4$, and $\lambda/\Lambda<0.3$. In other embodiments of holey fiber or PCF, for example, $d/\Lambda>0.75$, $N \leq 2$, and $\lambda/\Lambda<0.3$. The range of different fiber designs, however, should not be limited to these parameters as wide variation is possible.

FIGS. 5 and 6 now illustrate how, for a given number of layers of holes, leakage loss can be changed by adjusting the hole dimension and hole spacing. While N=2 configuration is used for describing FIGS. 5 and 6, it will be understood that the concept applies to other configurations of N.

Figure 5A:
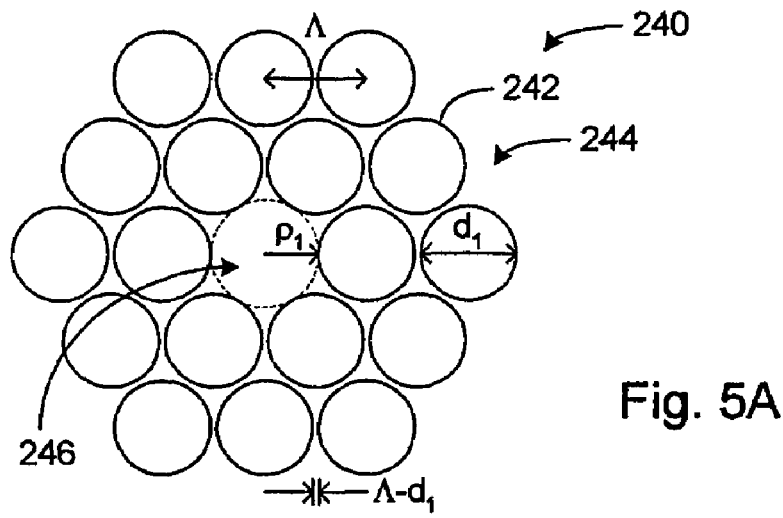
FIGS. 5A-C schematically illustrate how the hole dimension can be varied to affect the leakage losses of various modes.
Figure 5B:
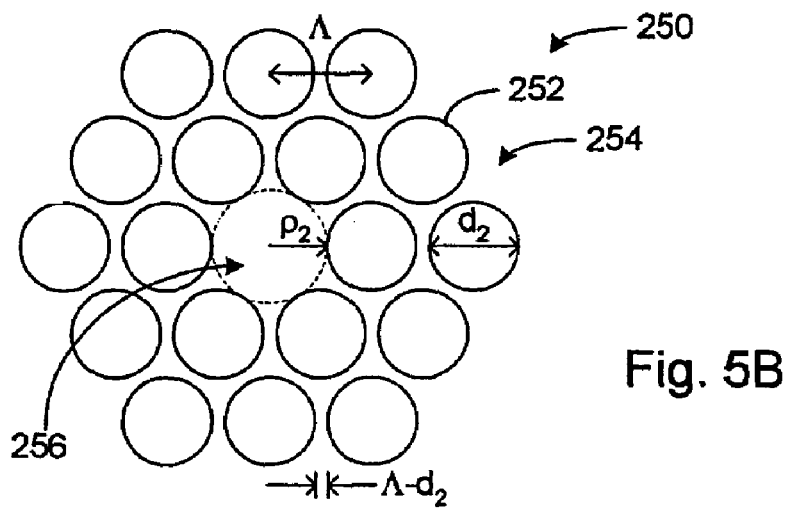
Figure 5C:
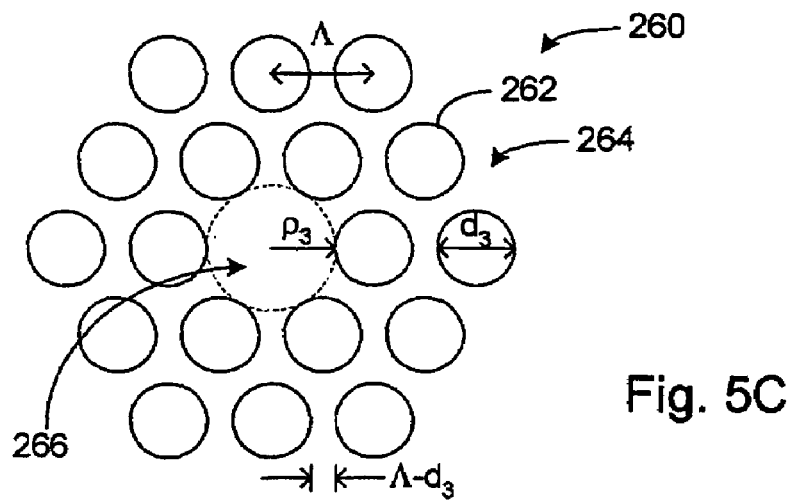

FIGS. 5A-C illustrate three exemplary PCFs 240, 250, 260 having a substantially constant hole spacing $\Lambda$. As shown in FIG. 5A, a first exemplary cladding region 244 comprises two layers of holes 242 having a first diameter $d_1$ arranged with the hole spacing $\Lambda$. Such a configuration results in a first core 246 having a first core diameter of $2\rho_1$, and a first gap dimension (between two adjacent holes) of $\Lambda-d_1$.

As shown in FIG. 5B, a second exemplary cladding region 254 comprises two layers of holes 252 having a second diameter $d_2$ arranged with the hole spacing $\Lambda$. Such a configuration results in a second core 256 having a second core diameter of $2\rho_2$, and a second gap dimension (between two adjacent holes) of $\Lambda-d_2$.

As shown in FIG. 5C, a third exemplary cladding region 264 comprises two layers of holes 262 having a third diameter $d_3$ arranged with the hole spacing $\Lambda$. Such a configuration results in a third core 266 having a third core diameter of $2\rho_3$, and a third gap dimension (between two adjacent holes) of $\Lambda-d_3$.

From FIGS. 5A-C, one can see that as the hole diameter decreases ($d_1>d_2>d_3$), the gap between the holes increases ($\Lambda-d_1<\Lambda-d_2<\Lambda-d_3$), thereby allowing greater leakage losses. One can also see that the core size increases ($\rho_1<\rho_2<\rho_3$) as the hole diameter decreases. Thus, one can select a desired gap (and possibly its corresponding core size) by selecting a hole size for a given hole spacing.

Figure 6A:
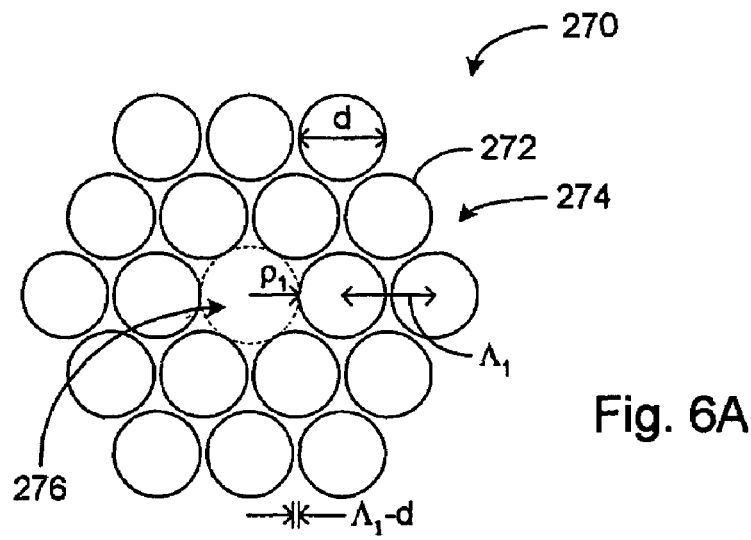
FIGS. 6A-C schematically illustrate how the hole spacing can be varied to affect the leakage losses of various modes.
Figure 6B:
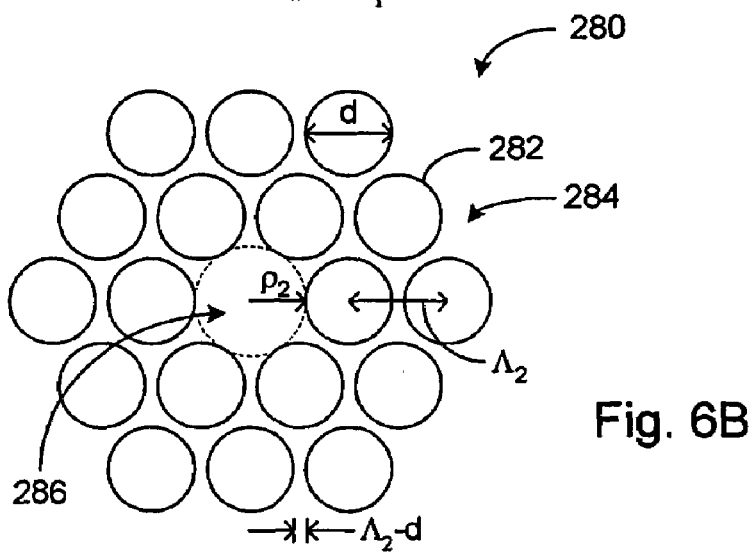
Figure 6C:
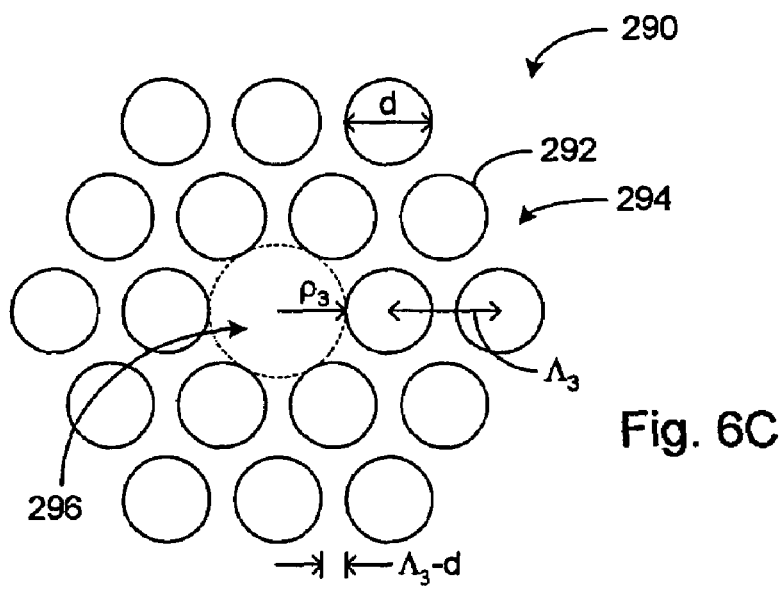

FIGS. 6A-C now illustrate three exemplary PCFs 270, 280, 290 having a substantially constant hole dimension d. As shown in FIG. 6A, a first exemplary cladding region 274 comprises two layers of holes 272 having the diameter d arranged with a first hole spacing $\Lambda_1$. Such a configuration results in a first core 276 having a first core diameter of $2\rho_1$, and a first gap dimension (between two adjacent holes) of $\Lambda_1-d$.

As shown in FIG. 6B, a second exemplary cladding region 284 comprises two layers of holes 282 having the diameter d arranged with a second hole spacing $\Lambda_2$. Such a configuration results in a second core 286 having a second core diameter of $2\rho_2$, and a second gap dimension (between two adjacent holes) of $\Lambda_2-d$.

As shown in FIG. 6C, a third exemplary cladding region 294 comprises two layers of holes 292 having the diameter d arranged with a third hole spacing $\Lambda_3$. Such a configuration results in a third core 296 having a third core diameter of $2\rho_3$, and a third gap dimension (between two adjacent holes) of $\Lambda_3-d$.

From FIGS. 6A-C, one can see that as the hole spacing increases ($\Lambda_1<\Lambda_2<\Lambda_3$), the gap between the holes increases also ($\Lambda-d_1<\Lambda-d_2<\Lambda-d_3$), thereby allowing greater leakage losses. One can also see that the core size increases ($\rho_1<\rho_2<\rho_3$) as the hole spacing increases. Thus, one can select a desired gap (and possibly its corresponding core size) by selecting a hole spacing for a given hole dimension.

The leakage adjustments described above in reference to FIGS. 5 and 6 are done by independently adjusting the hole size and hole spacing. One can also adjust the leakage by adjusting the hole size and hole spacing in some combination to achieve a desired leakage property. Furthermore, hole size and spacing may change from layer to layer possibly to achieve a desired result.

Figure 7:
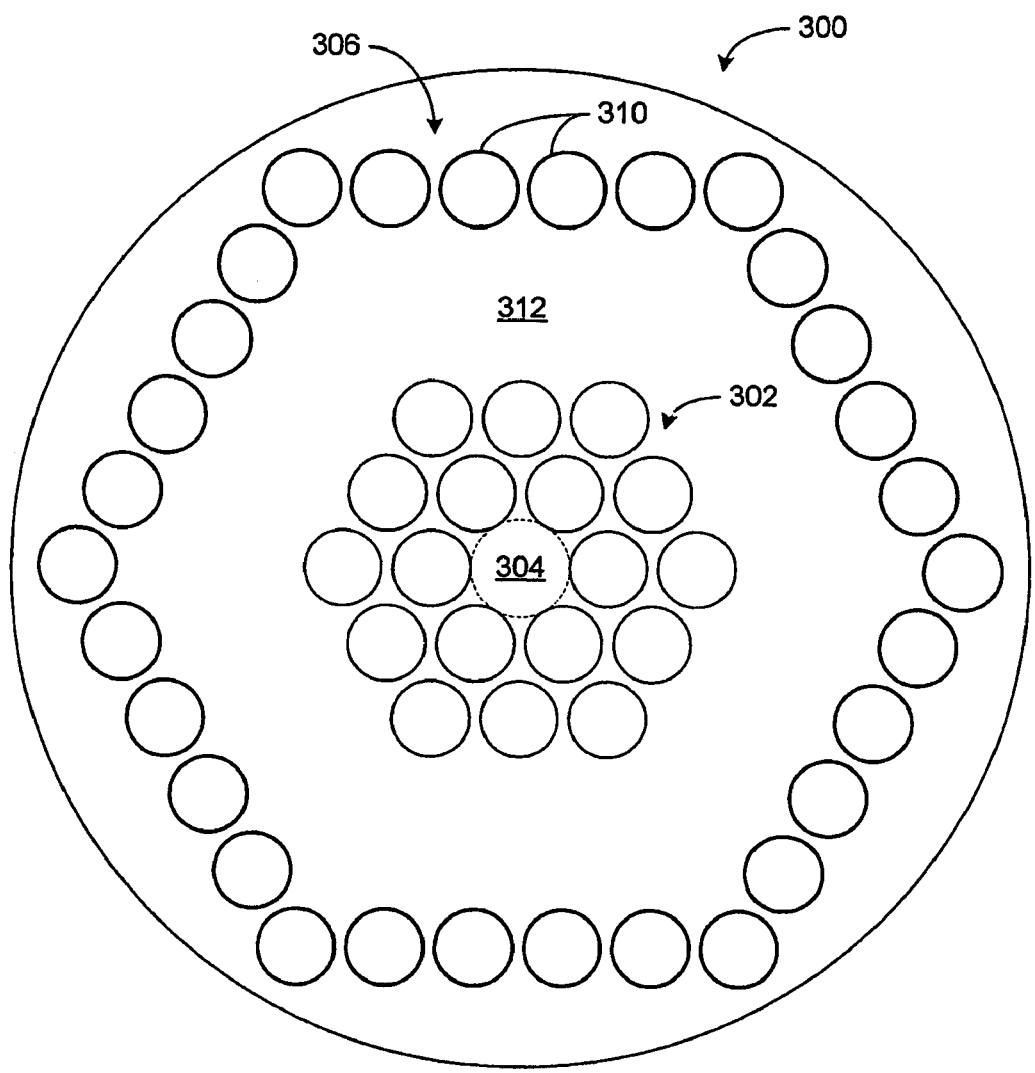
FIG. 7 schematically illustrates one embodiment of a PCF having a relatively large core capable of supporting propagation of only a single optical mode, and further comprising an outer cladding region formed by a plurality of holes for supporting multiple modes.
Figure 8:
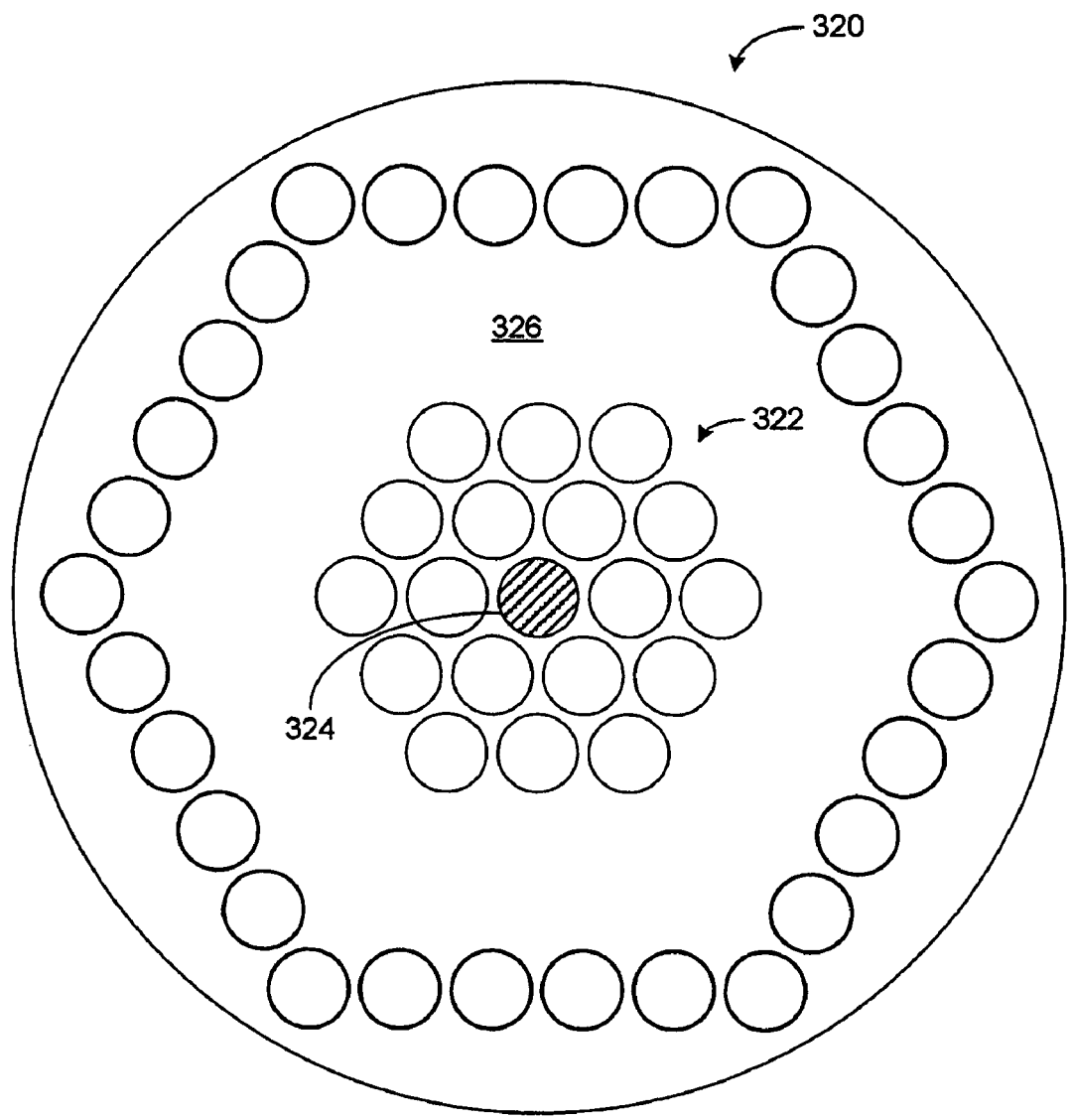
FIG. 8 schematically illustrates one embodiment of a PCF having a relatively large doped core region capable of single mode propagation.

FIGS. 7-9 now illustrate various embodiments of PCFs that incorporate relatively large cores and are capable of single-mode propagation where only a single mode is propagated and propagation of higher order modes are suppressed. FIG. 7 illustrates an exemplary PCF 300 having a cladding region 302 that allows single-mode propagation through a relatively large core 304. The PCF 300 further comprises an outer cladding 306 disposed on an exterior portion 312 of the PCF 300. The exemplary outer cladding 306 comprises a plurality of holes 310 arranged in a hexagonal shape. In one embodiment, the hexagonal shape of the outer cladding 306 is substantially concentric with the hexagonal shape of the cladding region 302.

Such a "double-clad" fiber can be used, for example, in fiber amplifiers, lasers, CW or pulsed light sources, or in other devices and systems where the fiber is pumped. An outer cladding formed from holes can provide a number of advantageous features over conventional double-clad fibers. One possible advantage is that a low index polymer coating of conventional double-clad fibers can be eliminated. Low index polymer coatings can be damaged relatively easily by heat and high optical power, thus potentially posing reliability and stability problems for high power applications. Another possible advantage is that a relatively high numerical aperture can be achieved when compared to conventional double-clad fibers. This feature allows for a smaller pump waveguide and consequently improved overlap of pump and laser light, possibly leading to a shorter device length. A shorter device, in addition to being more compact and economical, also reduces nonlinear effects that limit the peak power of lasers and amplifiers.

FIG. 8 illustrates another embodiment of a PCF 320 having a cladding region 322 that allows single-mode propagation through a relatively large core area. The PCF 320 further comprises a doped core 324 disposed in the core area. Such a doped core PCF may include an outer cladding formed by a plurality of holes disposed on an outer region 326 about the cladding region 322. In one embodiment, the doped core 324 comprises a rare earth doped core that allows the PCF 320 to be used as a gain medium such as in a fiber laser or a fiber amplifier.

FIGS. 9A-D illustrate various embodiments of PCFs having cladding regions that allow single-mode propagation through relatively large core areas. The cladding regions include asymmetries that facilitate polarization maintenance of single-mode polarized optical signals propagating through the respective cores.

Figure 9A:
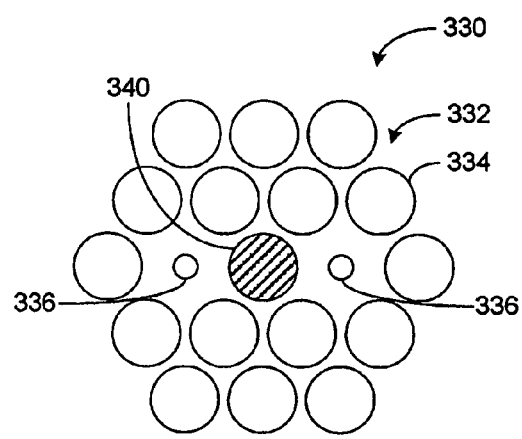
FIGS. 9A-F schematically illustrate various embodiments of holey fiber having asymmetric hole arrangements disposed about a relatively large core so as to facilitate polarization maintaining (PM) single-mode propagation.

FIG. 9A illustrates an exemplary PCF 330 having a cladding region 332 that allows single-mode propagation through a relatively large core area. In the exemplary PCF 330, the core area is occupied with a doped core 340 to provide a gain medium. The cladding region 332 comprises a plurality of first holes 334 that form one or more layers. The cladding region 332 includes an asymmetry introduced by second holes 336 that are different from the first holes 334. In one embodiment, the second holes 336 are smaller than the first holes 334, and are aligned on opposite sides of the core area thereby allowing a preferential orientation of the optical signal's electric field.

Figure 9B:
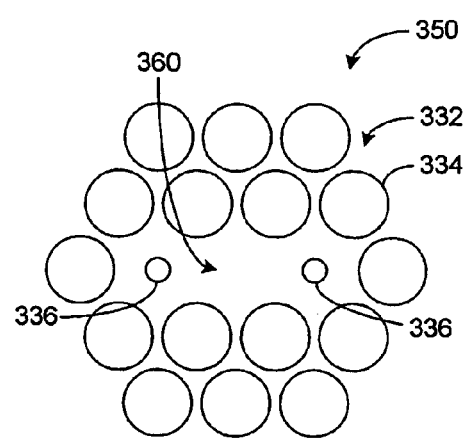

FIG. 9B illustrates an exemplary PCF 350 having the cladding region 332 (similar to FIG. 9A) that allows single-mode propagation through a relatively large core 360. The cladding region 332 and the asymmetry therein allows polarization maintained single-mode propagation through the core 360.

Figure 9C:
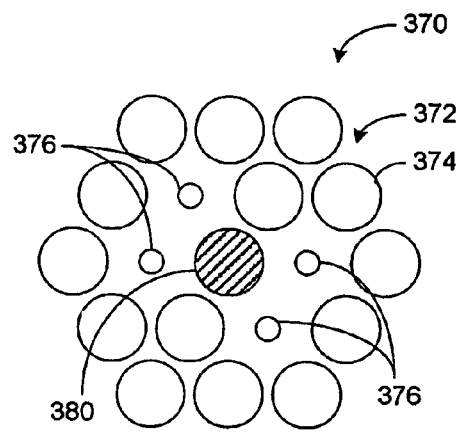

FIG. 9C illustrates an exemplary PCF 370 having a cladding region 372 that allows single-mode propagation through a relatively large core area. Similar to the PCF 330 of FIG. 9A, the exemplary PCF 370 has a doped core 380 to provide a gain medium. An asymmetry of the cladding region 372 is achieved by smaller holes 376 (smaller than holes 374) disposed about the core 380, thereby allowing a preferential orientation of the optical signal's electric field.

Figure 9D:
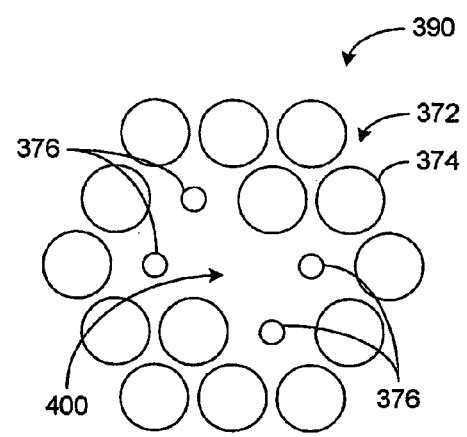

FIG. 9D illustrates an exemplary PCF 390 having the cladding region 372 (similar to FIG. 9C) that allows single-mode propagation through a relatively large core 400. The cladding region 372 and the asymmetry therein allows polarization maintained single-mode propagation through the core 400.

Figure 9F:
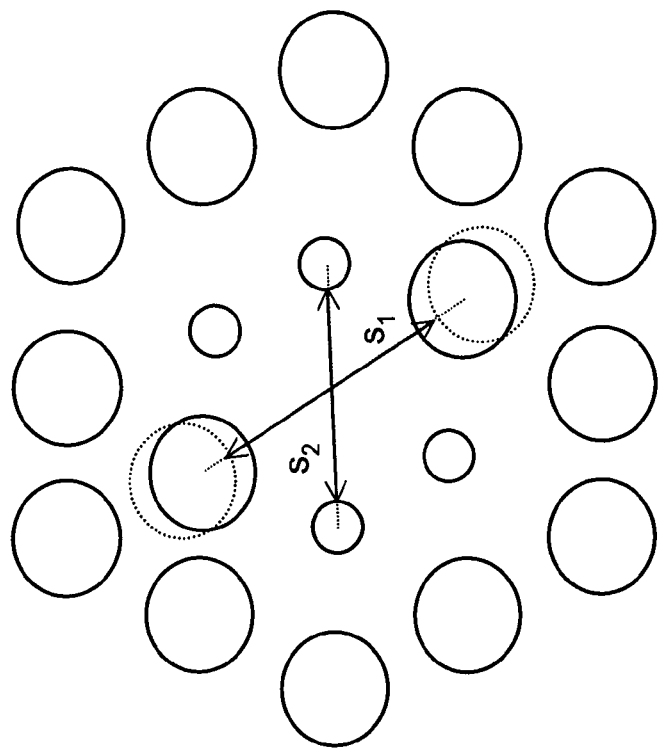
Figure 9E:
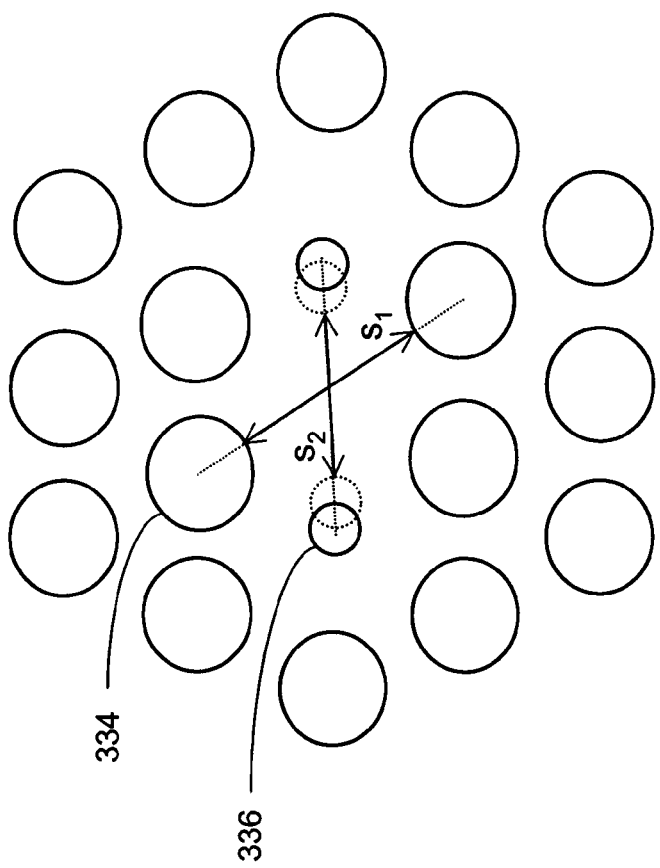

As shown in FIGS. 9E and 9F, the position of the first larger set of holes 334 and the position of the second smaller set of holes 336 can be selected such that the separation ($s_1$) of the larger holes 334 is approximately equal to the separation ($s_2$) of the smaller holes 336 ($s_1 \approx s_2$). (These separations $s_1$, $s_2$ and general position of the holes 334, 336 may be measured, for example, from the center of the holes 334, 336.) This configuration provides a more circular fundamental mode, which is desirable in many applications. In various preferred embodiments, the positions of these holes 334, 336 are located at lattice points corresponding to the lattice (e.g., a generally hexagonal lattice) having an average spacing $\Lambda$, as described above. Alternatively, the small holes 336 can be closer (see holes in phantom in FIG. 9E) or the large holes 334 (see hole in phantom in FIG. 9F) can be farther apart. FIG. 9E shows the small holes 336 shifted with respect to the lattice positions and in particular toward the center of the fiber. By contrast, FIG. 9F shows the large holes 334 shifted with respect to the lattice positions and in particular away the center of the fiber. Other configurations are also possible.

The various PCFs described above in reference to FIGS. 2-9 have cores that occupy areas where the respective center holes would otherwise be located. It will be appreciated that a relatively large core may include area(s) in other regions as well. As an example, two adjacent holes of the first layer may be removed to yield a triangular shaped core that is slightly off-center from the geometric center of the hexagonal shaped cladding region. In another example, the whole first layer may be removed so as to yield a larger core whose dimension is similar to that of the outer periphery of the first layer.

Whether such enlarged cores can support single-mode propagation depends on the extent of leakage losses of non-fundamental (higher order) modes with respect to the loss of the fundamental mode for a given length of the PCF. Various properties of the holey cladding described above (hole size, hole spacing, number of layers, hole composition etc.) may be adjusted to achieve single-mode propagation through the enlarged core. Alternatively, various properties of the holey cladding may be selected to allow propagation of a few selected modes of an optical signal.

As used herein, the "optical signal" refers broadly to propagated optical energy or power and is not limited to an optical carrier for voice, data, or information. For example, the optical signal may correspond to the light propagating through an optical fiber amplifier or the output of a fiber optic laser or other light source.

One aspect of the present teachings relates to propagating a single-mode signal through a fiber that supports multiple modes. Because the "mode-selection" in holey fibers depends on the relative leakage losses of different modes, the holey fiber can be configured to allow propagation of a several non-fundamental modes configuring the cladding region to "include" (i.e., not allow substantial loss by leakage) these higher order modes. Such a holey fiber for propagating multiple modes (e.g., about 20 modes or more) or "few"-modes can be made, for example, by removing one or more inner layers, as illustrated in FIGS. 10A and B.

Figure 10A:
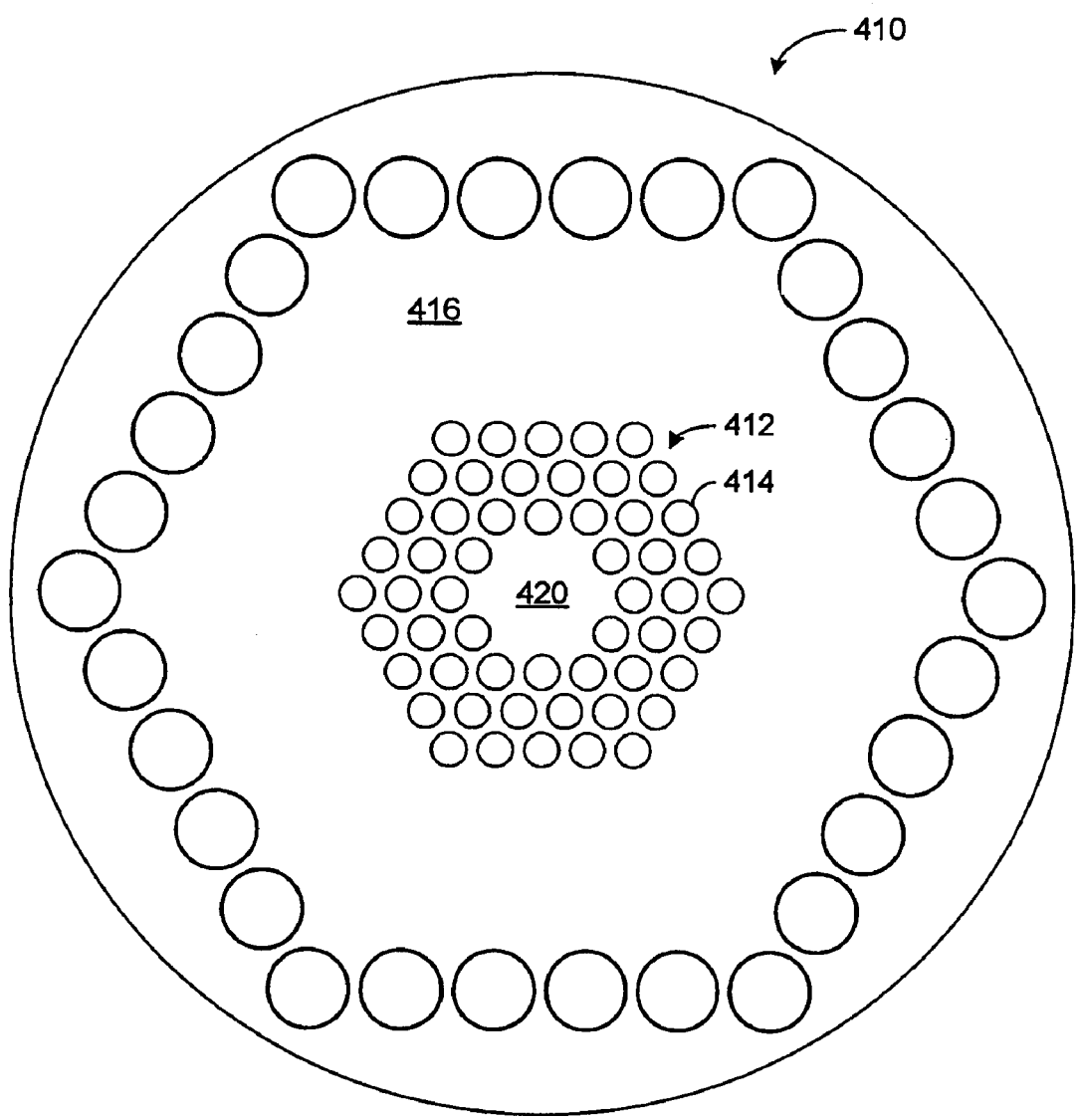
FIGS. 10A-D schematically illustrate how an effective core dimension of a PCF can be changed by "removing" different number of inner "rings" or layers, wherein such core dimension can be used to allow propagation of selected modes through a relatively large core.

In FIG. 10A, an exemplary PCF 410 comprises a cladding region 412 formed by a hexagonal array of holes 414. In one embodiment, a core 420 is formed in an area where the center hole and the first layer of holes (not shown) would otherwise be located in the array. The exemplary PCF 410 may further include an outer cladding disposed on an outer region 416.

Figure 10B:
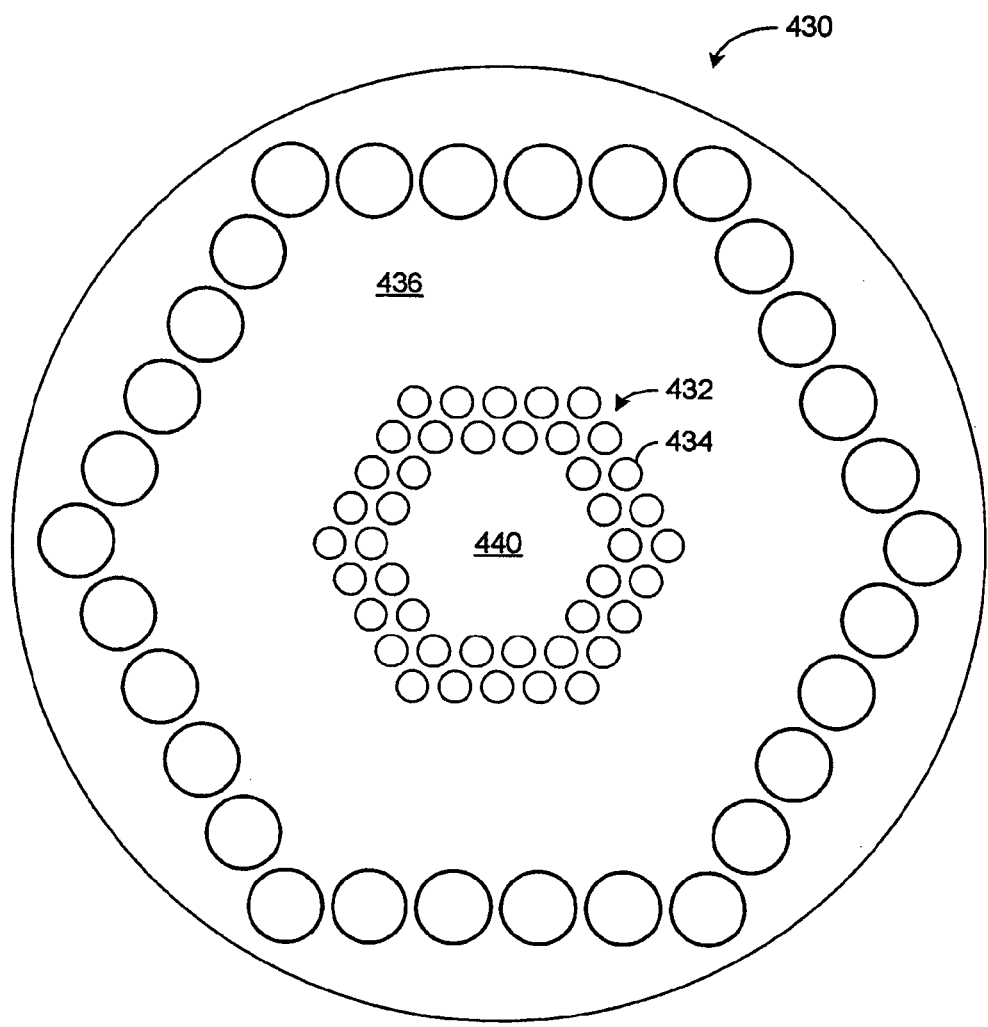

In FIG. 10B, an exemplary PCF 430 comprises a cladding region 432 formed by a hexagonal array of holes 434. In one embodiment, a core 440 is formed by additionally removing the second layer of holes. The exemplary PCF 430 may further includes an outer cladding disposed on an outer region 416. Thus, one can see that the resulting core 440 (and the core 420 of FIG. 10A) can be relatively large to allow handling of high power optical signals without excess intensity levels being reached that cause optical non-linear effects, which might impair operation.

Figure 10C:
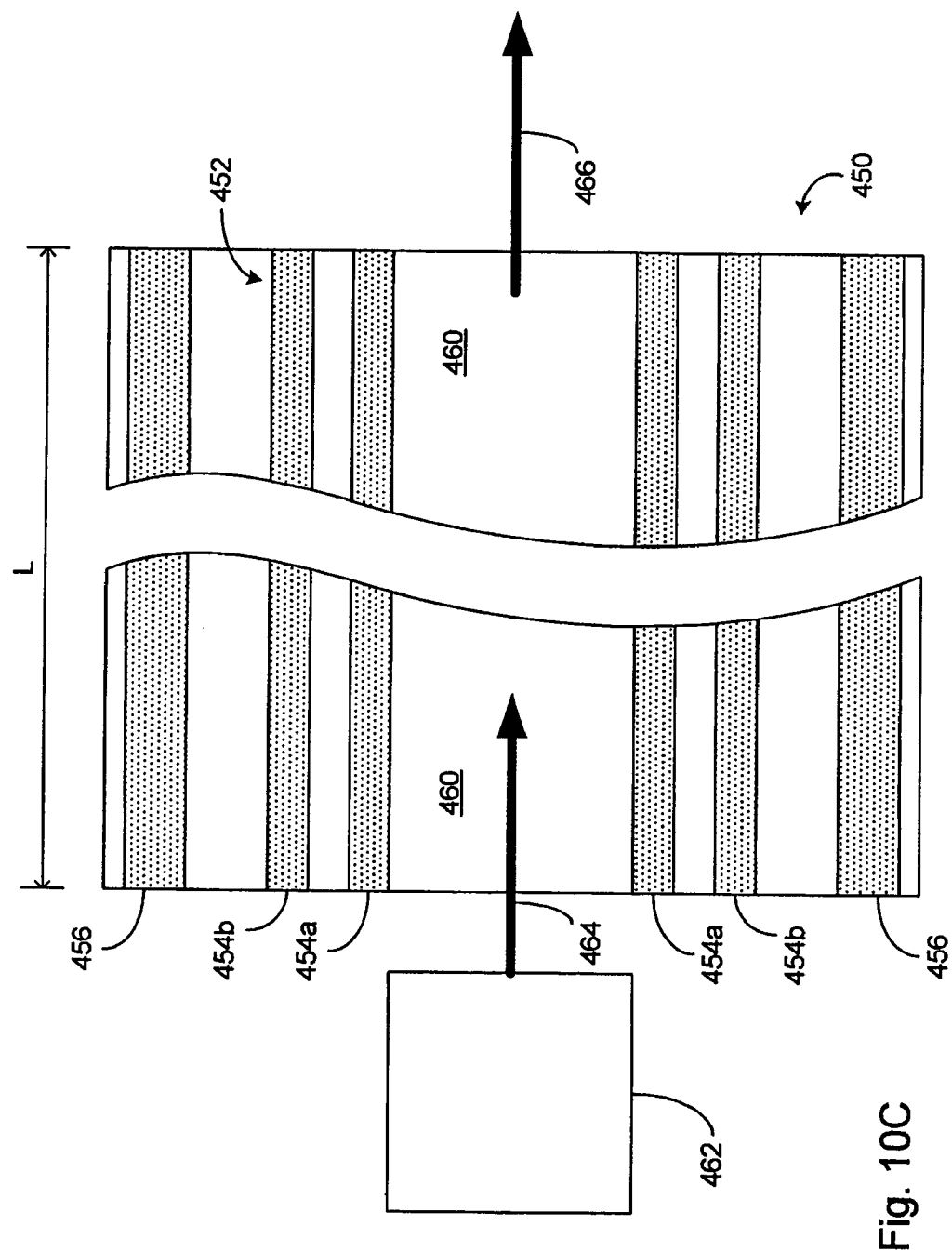

FIGS. 10C and D now illustrate how a single-mode signal can be propagated through a given length of a PCF that support a few optical modes. In FIG. 10C, one embodiment of a PCF 450 that supports "few"-mode comprises two (exemplary) layers 454a, 454b of holes forming a cladding region 452 about a relatively large core 460. Although an outer cladding 456 is shown in FIG. 10C, such a feature may not be desired in some embodiments.

As shown in FIG. 10C, a single-mode signal 464 without higher order modes is launched into the core 460 of the PCF 450 from a signal source 462. The single-mode signal 464 is shown to substantially survive the length L of the PCF 450 to emerge as a single-mode signal 466. The survival of the single mode signal can be facilitated by a relatively large modal spacing of the PCF. PCFs that support multiple optical modes can be designed to have large modal spacing, greater than approximately 0.001, between the fundamental mode and the next higher order mode while having a large core (with a diameter potentially in the hundreds of microns). The large modal spacing reduces inter-modal coupling. Thus, a fundamental mode signal (464 in FIG. 10C) launched into the PCF that support propagation of multiple modes is expected to be robustly guided in that single mode through a given length of the PCF.

A variety of techniques may be employed to launch a single-mode into the fiber that supports multiple optical modes. For example, an optical coupler may be disposed with respect to the core region to couple light into the core region. The optical coupler may be configured to output light having an optical distribution substantially matching the mode profile of the fundamental mode. More of the light is thereby substantially coupled into the signal mode of the fiber than higher order modes. The optical coupler may comprises, for example, a lens or other optics having suitably characteristics (e.g., optical power, numerical aperture, etc.) and that is disposed with respect to the core region to focus light down to a size substantially matching the size of the mode profile of the fundamental mode. Alternatively, the optical coupler may comprise a waveguide that outputs light having a distribution substantially matching the mode profile of the fundamental mode. Other techniques may be employed as well.

Figure 10D:
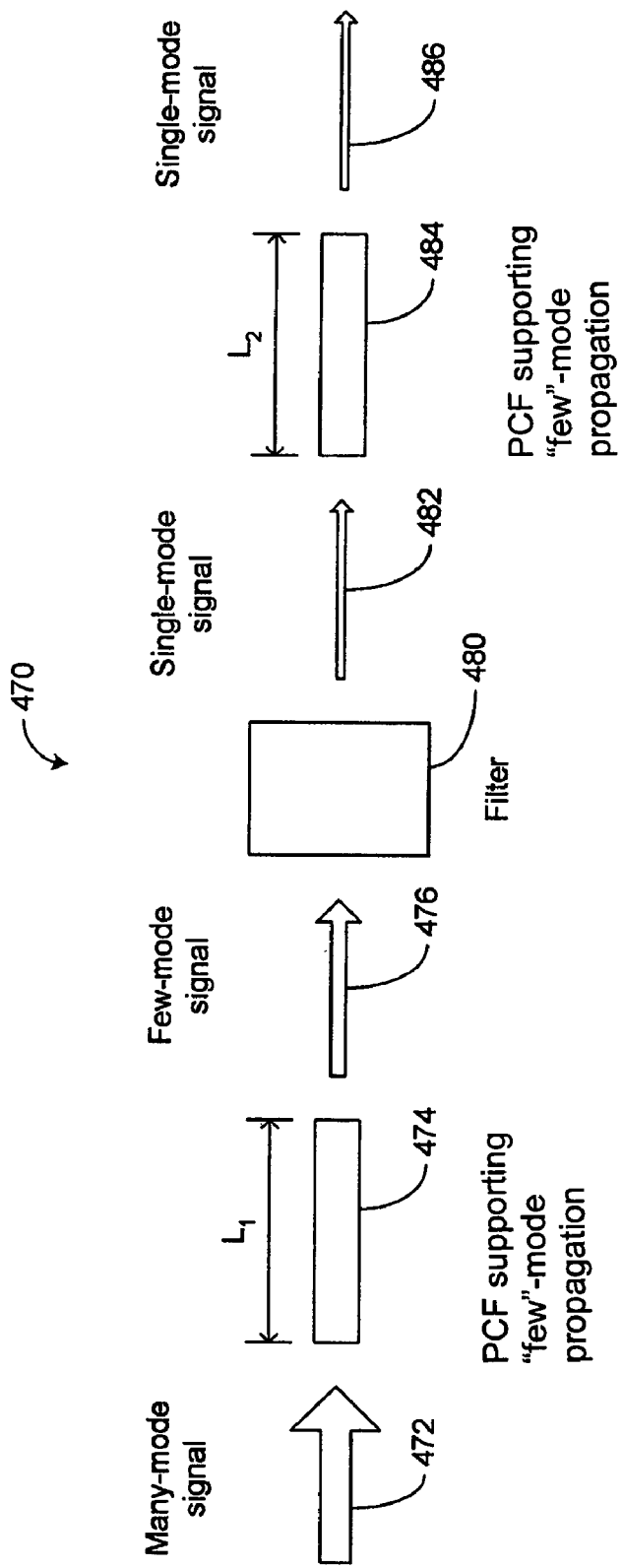

FIG. 10D illustrates a block diagram of an exemplary optical signal propagating system 470 that reduces a high power multi-mode signal 472, with, e.g., 20 or more optical modes, to a single-mode signal 486. One or more segments of a PCF that supports a "few" optical modes as described above in reference to FIGS. 10A-C are employed. The exemplary signal 472 having many modes is shown to be launched into a first PCF 474 having a first length $L_1$ that supports a few optical modes. After traveling through the first length $L_1$, the many-mode signal 472 is reduced to a few-mode signal 476 because modes other than the few modes are lost by leakage. The "few"-mode signal 476 is then shown to pass through a filter 480 that filters out non-fundamental modes from the few-mode signal 476. The filter 480 can be configured to substantially eliminate the power in the higher order mode(s) while allowing passage of the fundamental mode. Such mode filtering can be implemented by devices and/or techniques such as a tapers, bends, grating such as long periot grating to couple higher order modes into leaky modes, and gain/loss profiling. Mode filters are described in U.S. Pat. No. 5,818,630 issued to Fermann et al on Oct. 6, 1998 and entitled "Single-mode Amplifier and Compressors Based on Multi-mode Fibers", which is hereby incorporated herein by reference.

As further shown in FIG. 10D, a single-mode signal 482 emerges from the filter 480. The single-mode signal 482 can then be guided through a second PCF 484 (length $L_2$) that supports few-mode propagation to result in the output single-mode signal 486.

Figure 11:
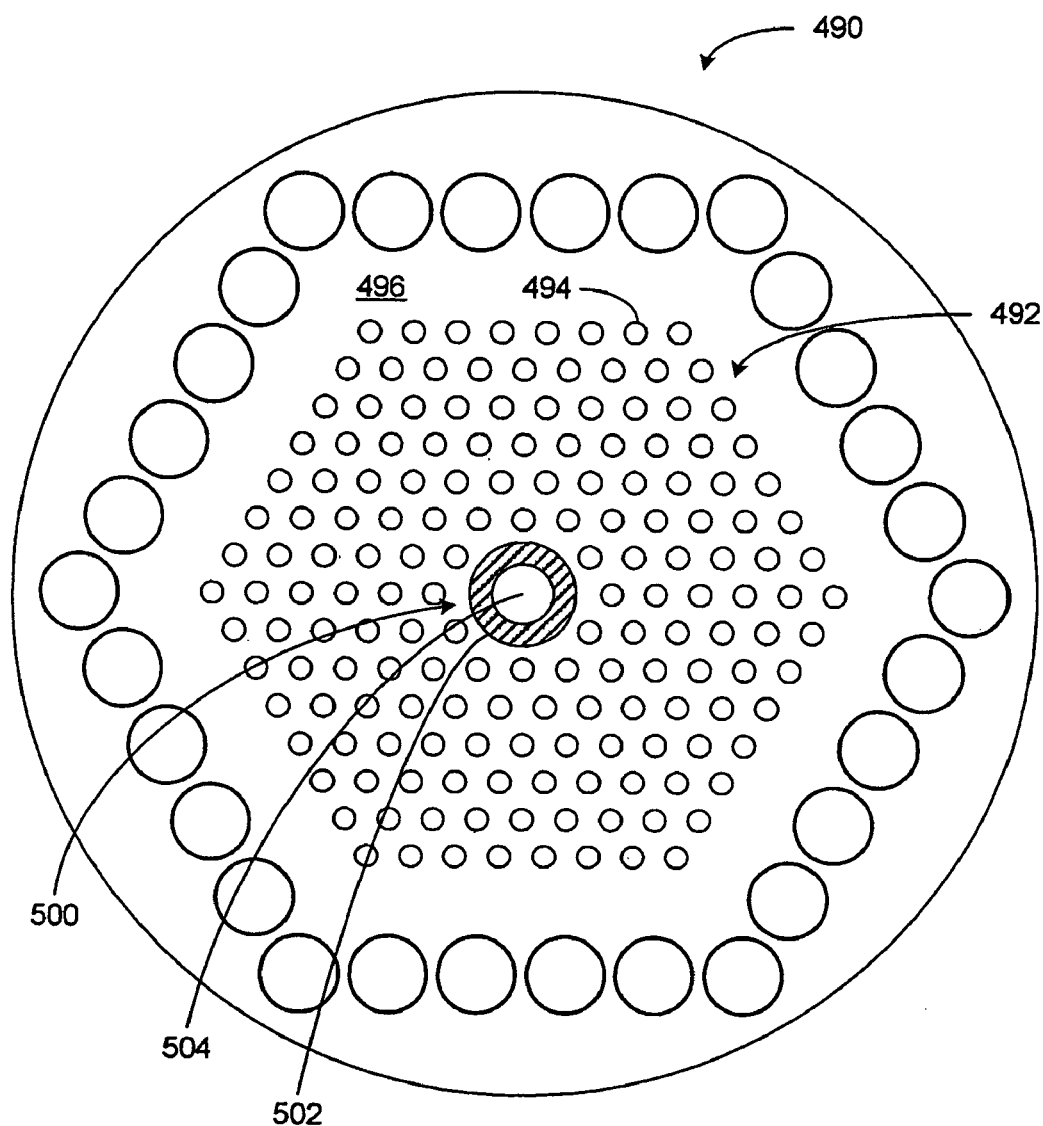
FIG. 11 schematically illustrates one embodiment of a PCF having a doped ring or annular section disposed about a hollow region the core to provide gain.

Another aspect of the present teachings relates to a PCF having a plurality of holes arranged in an array or lattice that meets the Bragg condition for a given signal wavelength. In accordance with description presented above, such a PCF is referred to as a PBF (photonic bandgap fiber). FIG. 11 illustrates an exemplary PBF 490 having an array 492 of holes 494 disposed on a fiber material 476. The array 492 defines a core area 500 through which the signal propagates.

Because a PBF relies on Bragg reflection or scattering rather than average refractive index difference, the core can have a low refractive index. Consequently, the core can be evacuated or filled with air or other gases or medium that have very low nonlinear effects. Such an advantageous feature can lead to a significant reduction of nonlinear effect, and consequently, very high optical power can propagate in these PBFs without suffering from nonlinear distortion.

In one embodiment, the core 500 further comprises a doped ring-shaped or annular region 502 disposed about the center of the core. As FIG. 11 is a cross-sectional view of the fiber, the doped region 502 may comprise a doped portion having a shape of a hollow right circular cylinder. Accordingly, an open inner region 504 of the doped ring 502 can be filled with air or other gases to reduce the nonlinear effect of the PBF. Various other configurations are possible. For example, the doped region may be rectilinear and have a square or rectangular cross-section when viewed from the vantage point presented in FIG. 11. Alternatively, the cross-sectional view of the doped region may be triangular, pentagonal, hexagonal, octagonal, or have any wide variety of regular or irregular shapes. This region also need not be contiguous and may comprise lobes or segmented portions. For example, the doped region may comprise two or more portions oppositely situated with respect to the hollow core. Still other variations are possible. In various embodiments, however, the doped region 502 in the PBF core can provide gain for lasers and amplifiers; and such lasers and amplifiers can have very high outputs.

Figure 12:
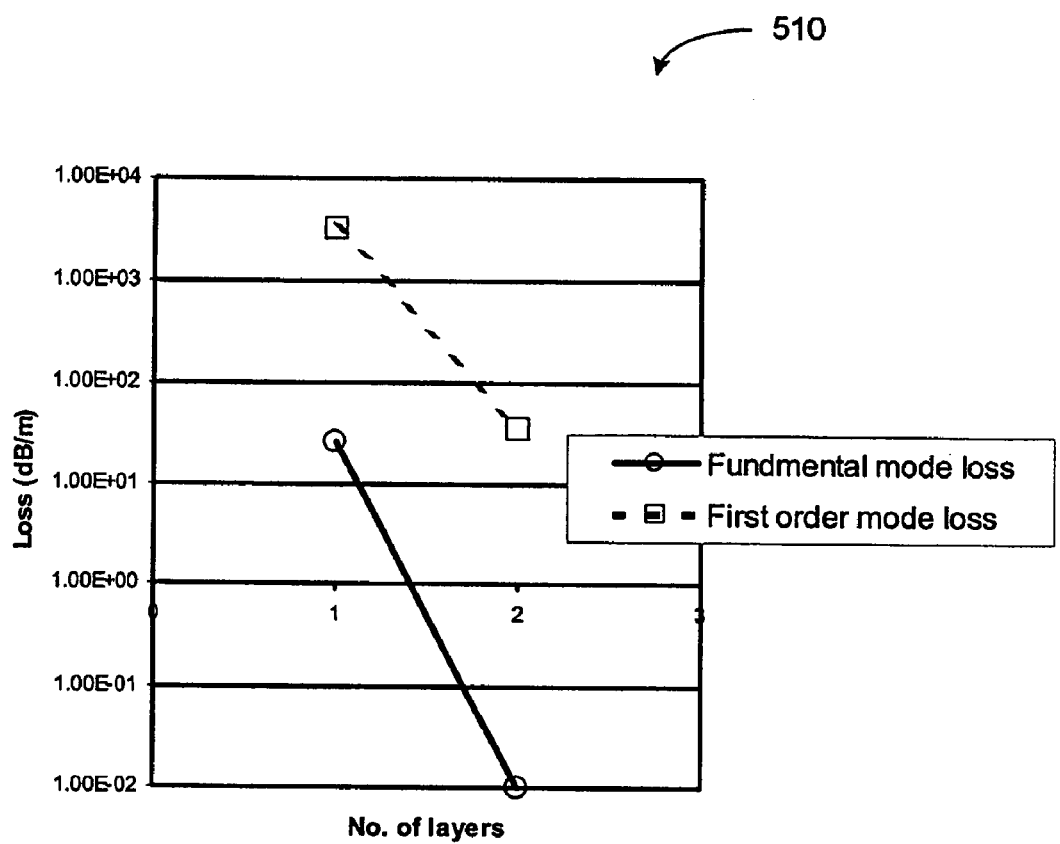
FIG. 12 illustrates loss as a function of number of layers for fundamental and first order modes.
Figure 13:
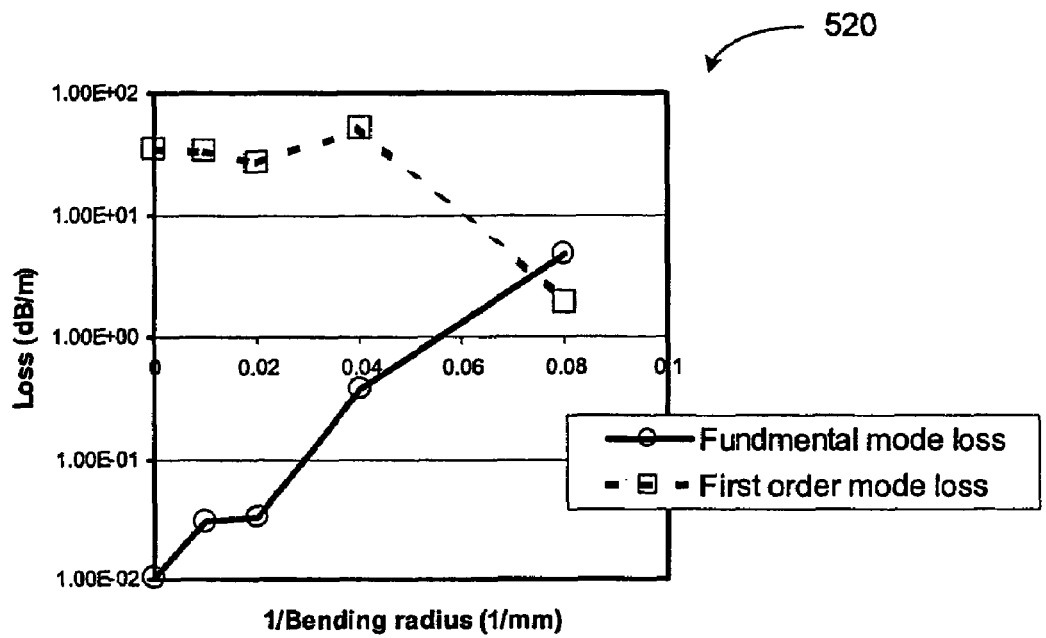
FIG. 13 illustrates loss as a function of inverse bending radius for fundamental and first order modes.
Figure 14:
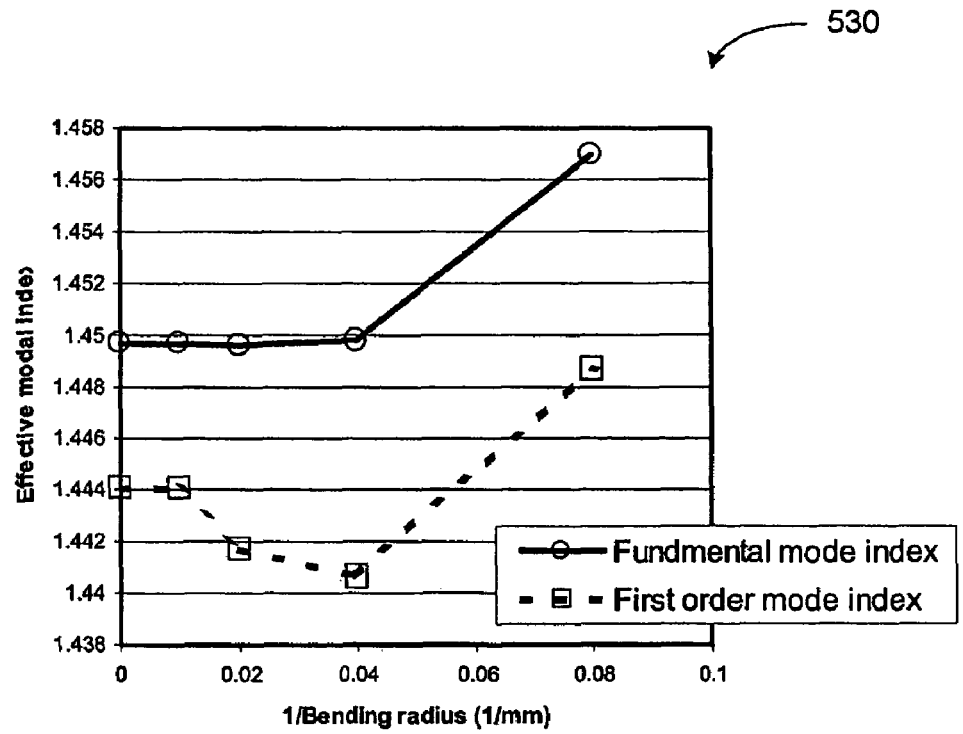
FIG. 14 illustrates effective modal index as a function of inverse bending radius for fundamental and first order modes.

FIGS. 12-14 illustrate various properties of holey fibers and results of computer simulations that characterize the fundamental and first-order modes. FIG. 12 illustrates a loss profile 510 for the fundamental and first-order modes of a PCF as a function of the number of layers of holes. For this simulation, hole dimension and hole spacing were d=35 μm and L=40 μm respectively (thus having a core diameter of approximately 45 μm). The N=2 data point corresponds to the cladding region configuration described above in reference to FIG. 4B, and the N=1 data point corresponds to the cladding region with the second layer removed.

One can see that the leakage loss depends strongly on the number of layers. As expected, a reduction in N (N=2 to N=1) results in an increase in power leakage for both modes. For the fundamental mode, the reduction in N (2 to 1) causes a leakage increase by more than three orders of magnitude. For the first-order mode, the same reduction in N causes a leakage increase by about two orders of magnitude.

Because of such a strong dependence in N, one approach to designing a PCF for a particular application is to first coarsely tune the leakage loss with selection of the number of layer or row, N. Once the leakage loss is in the desired general or broad range, fine-tuning of the leakage loss can be performed by varying the hole size. As expected, and as described above in reference to FIGS. 5A-C, smaller holes generally lead to higher power leakage.

In general for higher-modes, increases in power leakage are substantially greater for different value of N, as well as for smaller holes. Thus to design a PCF that propagates only a single optical mode, selecting the value of N and the hole size to substantially eliminate the first-order mode over a given length ensures that higher modes are also substantially eliminated.

In certain applications of PCFs, such as fiber lasers, amplifiers and delivery fibers, the fiber length is on the order of few meters or less. In such applications, $N \leq 3$ can achieve a single-mode operation for $d/\Lambda \geq 0.6$. Preferably, $d/\Lambda \geq 0.75$.

FIG. 13 illustrates a loss profile 520 as a function of bending of an exemplary PCF having two layers of air-filled holes, with d=35 μm and $\Lambda$=40 μm (thus with a core diameter of approximately 45 μm). The fundamental mode is largely confined by the air/hole boundary. This property leads to usefully low bending loss, arising from the fact that the mode in the region of the bend is substantially reduced as a result of the strong confinement of the air-hole boundary. At very small bending diameters, i.e. about 25 mm (inverse bending radius of approximately 0.04 $mm^{-1}$), fundamental mode loss on a bend can be large while first order mode loss on a bend can be substantially reduced by the mode reduction effect described below.

The bending loss is usually referred to as propagation loss associated with propagation through bends. To obtain the results shown in FIG. 13, the mode transition loss from straight fiber modes to bent fiber mode was not accounted for in the model. Such transitional loss depends on the nature of the transition and can be negligible on a slow adiabatic transition.

One can see that the amount of bend of a PCF can be used to determine how much power in the fundamental and first-order modes are lost due to bending. To aid in designing for bend induced loss, some of the properties of bend loss in PCFs described below can be useful.

The bending sensitivity of these types of fibers (e.g. large-hole PCFs) is very low. This result is due to the fact that modal area is progressively reduced with the decreasing diameter of the bends, which arises from the fact that the modal field is restricted from penetrating into the large nearby air holes. This characteristic is significantly different from traditional fibers and conventional PCFs, where modal field is displaced from the center with much less level of field distortion on a bend. As a consequence, the modal field moves beyond the core-clad boundary and produces large bending loss in traditional non-holey fibers and convention PCFs. This effect is especially true for large core designs in traditional fibers and conventional PCFs.

FIG. 14 illustrates how the effective modal indices of the fundamental and first-order modes for the exemplary large-core PCF of FIG. 13 (with two layers of holes, N=2, d=35 μm and $\Lambda$=40 μm, core diameter of 45 μm) changes as a function of inverse bending radius. The difference between the fundamental mode curve and the first-order mode curve corresponds to the modal spacing between the fundamental and first-order modes. One can see that the modal spacing is greater than approximately 0.005 throughout the measured range of bends. Such modal spacing (0.005) is much larger than that of conventional PCFs and traditional fibers. The high modal spacing is indicative of a very low inter-modal coupling, and is also an indicator of a robust single-mode operation. As a result of the high modal spacing (about 0.005), a perturbation of sub-millimeter period is needed for sufficient phase-matching to allow substantial inter-modal coupling, for example, in the exemplary N=2 PCF.

High modal spacing extends to even larger core diameters. For fibers whose core diameter is on the order of about 100 μm (such as the N=1 large core PCF of FIG. 4A), the fundamental to next higher order mode spacing is still significantly larger than that of traditional non-holey fibers and conventional PCFs. Again, this feature produces relatively low inter-modal coupling.

When core size is increased further, the modal spacing generally decreases. This trend, together with increased bending loss, may eventually set an upper limit on the maximum core diameter. Nevertheless, an increase in the core diameter by an order of magnitude over the largest conventional PCF that supports single-mode propagation (see, e.g., reference [4] in Table 1, with core diameter of 28 μm) may be possible with the techniques and designs described herein.

Figure 15:
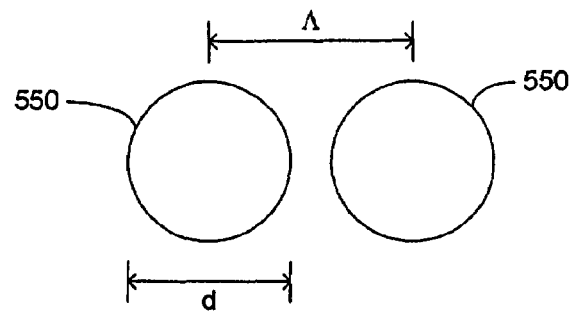
FIG. 15 schematically illustrates two exemplary holes or cladding features of a PCF, where a quantity d represents each hole's diameter and Λ represents the spacing between the holes.
Figure 16A:
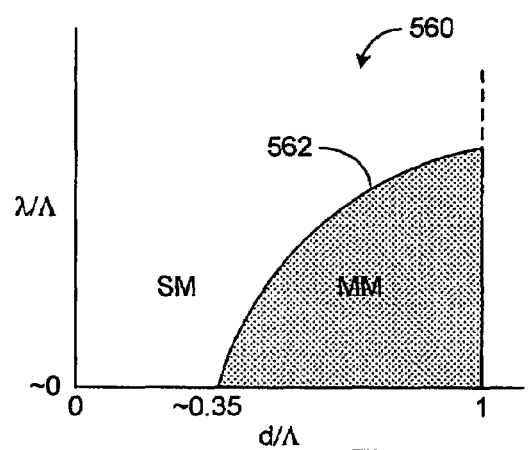
FIGS. 16A-C are schematic representations illustrating the operating characteristics of a PCF, where single-mode and multi-mode propagation regimes are separated by curves representative of different numbers of layers on a plot of $\lambda/\Lambda$ versus $d/\Lambda$.
Figure 16B:
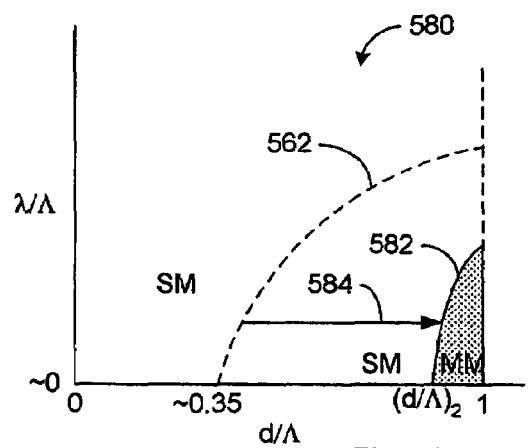
Figure 16C:
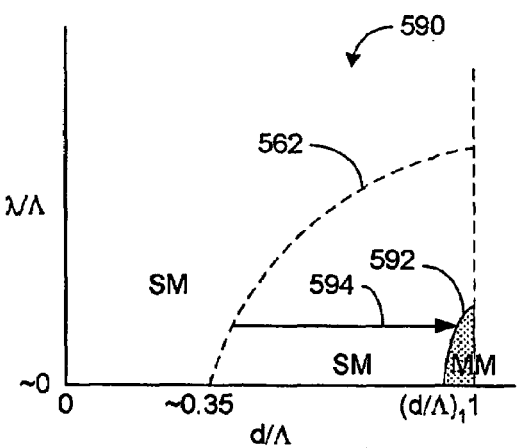

FIGS. 15-16 illustrate a method of characterizing the various PCFs for propagating only a single mode that also have large cores. FIG. 15 illustrates an exemplary pair of holes or cladding features 550, showing the hole's diameter d and the hole spacing $\Lambda$. Such holes arranged in a hexagonal manner as described above can lead to the various relationships between $\lambda/\Lambda$ and $d/\Lambda$ as illustrated in FIGS. 16A-C. Other configurations are also possible.

FIG. 16A illustrates a curve 562 that separates a single-mode (SM) propagation regime where only a single optical mode is propagated from a multi-mode (MM) propagation regime where multiple optical modes are propagated on a plot of $\lambda/\Lambda$ versus $d/\Lambda$ for PCFs. Conventional PCFs that operate in the SM propagation regime have a relatively small core size, as well as a relatively large number of hole layers ($N \geq 4$), such that the overall cross-sectional profile is generally similar to that of traditional fibers. For such a fiber, the value of $d/\Lambda$ is approximately 0.35 in the limit when $\lambda/\Lambda$ approaches zero. Thus, a region to the right of the curve 562 in FIG. 16A (i.e., increasing hole size relative to spacing, $d/\Lambda$) where $d/\Lambda \geq 0.4$ causes the PCF to become a MM fiber, thereby limiting the operable core size for SM operation.

FIG. 16B illustrates a curve 582 for the N=2 embodiment described above in reference to FIG. 4B and Table 1. In that embodiment, the value of $(d/\Lambda)_2$ is approximately 0.88 when $\lambda/\Lambda$ equals about 0.1 (for 10 meters of fiber, while this value would be larger for longer fiber). Thus, one can see that a usable SM propagation regime is advantageously extended from the curve 562 to the curve 582 as indicated by an arrow 584. A larger hole size relative to spacing can be used while maintaining SM operation. By choosing a large hole size, a corresponding hole spacing can yield a similarly large core size, as seen above in reference to Table 1.

FIG. 16C illustrates a curve 592 for the N=1 embodiment described above in reference to FIG. 4A and Table 1. In that embodiment, the value of $(d/\Lambda)_1$ is approximately 0.94 when $\lambda/\Lambda$ equals about 0.1 (for 10 meters of fiber, while this value would be larger for longer fiber). Thus, one can see that a usable SM propagation regime is advantageously extended even more from the curve 562 to the curve 592 as indicated by an arrow 594 thereby providing a larger core size for SM operation.

Figure 17:
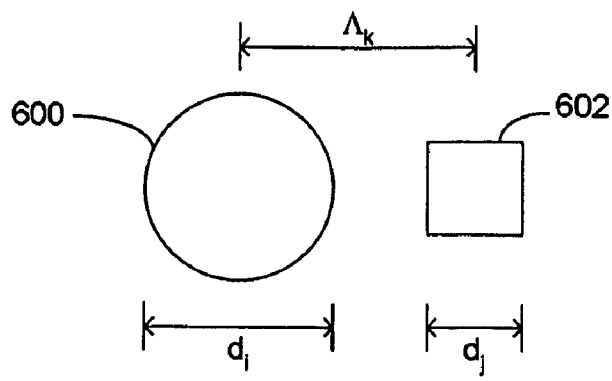
FIG. 17 schematically illustrates two exemplary hole features having different shapes and dimensions.

FIGS. 17-18 illustrate a generalized concept of the SM propagation regime extension described above in FIGS. 15-16 in context of holey fibers. As shown in FIG. 17, and described above in reference to FIGS. 1A and B, a holey fiber having the advantageously large core operable in SM can have an at least partially irregular or disordered arrangement of holes. Furthermore, the holes do not necessarily have to be of uniform size or shape. Such non-uniformity of holes is depicted in FIG. 17, where two exemplary holes 600 and 602 are circular and square shapes, respectively. Furthermore, the circular hole 600 is shown to have a dimension of $d_i$, and the square hole 602 is shown to have a dimension of $d_j$. An exemplary spacing between the two exemplary holes 600 and 602 is denoted as $\Lambda_k$.

Figure 18A:
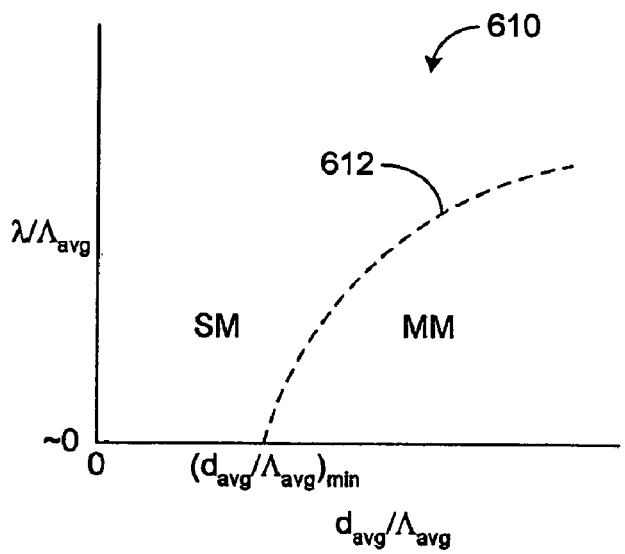
FIGS. 18A and B are schematic representations illustrating operating characteristics of a holey fiber, where single-mode and multi-mode regimes are separated by curves representative of different effective thicknesses for cladding regions on a plot of $\lambda/\Lambda_{avg}$ versus $d_{avg}/\Lambda_{avg}$.

For holey fibers whose cladding region is formed by such non-uniform holes, the hole spacing parameter and hole dimension parameter can be expressed as average values $d_{avg}$ and $\Lambda_{avg}$. Using such average parameters, a similar $\lambda/\Lambda$ versus $d/\Lambda$ relationship (as that of FIG. 16) can be expressed. FIG. 18A illustrates a curve 612 that separates the SM propagation regime from the MM propagation regime in the $\lambda/\Lambda_{avg}-d_{avg}/\Lambda_{avg}$ space. The value $(d_{avg}/\Lambda_{avg})_{min}$ represents the value of $d_{avg}/\Lambda_{avg}$ in the limit when $\lambda/\Lambda_{avg}$ approaches zero. Similar to the threshold value of $d/\Lambda$ being approximately 0.35 for conventional PCFs, the $(d_{avg}/\Lambda_{avg})$min can represent a threshold value for conventional holey fibers having a cladding region having a relatively thick average thickness about a core having a relatively small average dimension.

Figure 18B:
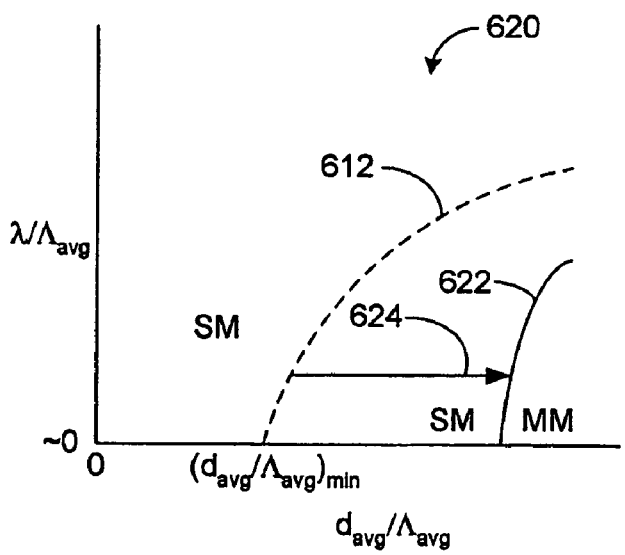

FIG. 18B illustrates a concept of extending the SM propagation regime in a manner similar to that described above in reference to FIGS. 16B-C. A usable SM propagation regime is advantageously extended from the curve 612 to a curve 622 as indicated by an arrow 624 thereby providing a larger average core size for SM operation. By choosing a large average hole size, a corresponding average hole spacing can yield a similarly large average core size.

The various fibers disclosed herein may be used, for example, in gain fiber, amplifiers, and lasers such as fiber amplifiers and fiber lasers and other systems as well. For example, these fibers may be employed to construct high power pulsed and CW laser systems or light sources. The various fibers disclosed herein may be used to construct high power pulsed and CW laser systems or light sources. These systems may comprise pumps, a length of fiber to provide gain media and a pair of mirrors at two ends of a fiber to form a cavity. Polarizing components can be added to achieve single polarization mode operation where only a single polarization mode is propagated. Dispersing elements can also be added for intra-cavity dispersion control. The fibers disclosed herein can also form the gain media in pulsed and CW optical amplifiers, which comprise of one or more optical pumps, pump couplers, and possibly isolators. The fibers disclosed herein can be used to form part of a fiber delivery system, where the output of a laser is launched into the fiber through a focusing element or a splice while the output of the fiber is directed by additional optics to a target. Other configurations and uses are possible.

The fibers disclosed herein can also be utilized in telecom applications to replace MM telecom fibers for short haul data transmission, where a large core size enables low cost and robust connectors while the single mode nature of the fiber can improve the bandwidth of the transmission system. In such applications, a second glass can be used instead of holes. Still other applications are possible.

Although the above-disclosed embodiments of the present invention have shown, described, and pointed out the fundamental novel features of the invention as applied to the above-disclosed embodiments, it should be understood that various omissions, substitutions, and changes in the form of the detail of the devices, systems, and/or methods illustrated may be made by those skilled in the art without departing from the scope of the present invention. Consequently, the scope of the invention should not be limited to the foregoing description, but should be defined by the appended claims.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

What is claimed is:

1. An optical fiber for propagating a fundamental mode and suppressing higher order modes, said optical fiber comprising:
   a cladding region comprising a plurality of cladding features disposed in a matrix, said plurality of cladding features having an average spacing, $\Lambda$, and an average size, d, said plurality of cladding features being substantially arranged in a plurality of rows, N; and
   a core region surrounded by said cladding region, said plurality of cladding features substantially confining propagation of said fundamental mode to said core region, said plurality of cladding features having (i) sufficient average spacing, $\Lambda$, to provide an increased effective core size, (ii) a sufficient average size, d, to provide substantial confinement of light within said core region, and (iii) an average number of rows, N, suitable to support propagation of said fundamental mode and suppress propagation of said plurality of higher order modes,
   wherein said average size, d, and said average spacing, $\Lambda$, is greater than or equal to 40 microns, have respective values that yield a ratio of $$\frac{d}{\Lambda}$$

that is at least about 0.35 to provide an increased effective core size and substantial confinement, and said average number of rows N is less than or equal to about 4 so as to provide single mode propagation.

2. The optical fiber of claim 1, wherein said cladding features comprise regions having different refractive index than said matrix.

3. The optical fiber of claim 2, wherein said regions comprise hollow channels in said matrix.

4. The optical fiber of claim 1, wherein said average spacing, $\Lambda$, is at least about 80 microns.

5. The optical fiber of claim 1, wherein said average size, d, is at least about 70 µm and said number of rows N is equal to 1.

6. The optical fiber of claim 1, wherein said average number of rows N is less than or equal to about 3.

7. The optical fiber of claim 1, wherein said average number of rows N is less than or equal to about 2.

8. The optical fiber of claim 1, wherein said average number of rows N is less than or equal to about 1.

9. The optical fiber of claim 1, wherein said ratio of $$\frac{d}{\Lambda}$$

is greater than or equal to about 0.4.

10. The optical fiber of claim 1, wherein said ratio of $$\frac{d}{\Lambda}$$

is greater than or equal to about 0.6.

11. The optical fiber of claim 1, wherein said ratio of $$\frac{d}{\Lambda}$$

is greater than or equal to about 0.8.

12. The optical fiber of claim 1, wherein said average spacing, $\Lambda$, is sufficiently large to satisfy the relationship $$\frac{\lambda}{\Lambda}$$

is less than or equal to about 0.3.

13. The optical fiber of claim 1, wherein said ratio of $$\frac{d}{\Lambda}$$

is greater than or equal to about 0.6, said average number of rows N is less than or equal to about 4 and $$\frac{\lambda}{\Lambda}$$

is less than or equal to about 0.3.

14. The optical fiber of claim 1, wherein said ratio of $$\frac{d}{\Lambda}$$

is greater than or equal to about 0.75, said average number of rows N is less than or equal to about 2 and $$\frac{\lambda}{\Lambda}$$

is less than or equal to about 0.3.

15. The optical fiber of claim 1, wherein said average size, d, said average spacing, $\Lambda$, and said average number of rows N have values that provide a leakage loss for said fundamental mode that is below about 1 dB and a leakage loss for said higher order modes that is above about 20 dB.

16. The optical fiber of claim 1, wherein said core region has a refractive index that is uniform to within about 0.001 as measured across a lateral cross-section that is perpendicular to the longitudinal direction of the fiber length.

17. The optical fiber of claim 1, wherein the V number is greater than about 2.4.

18. The optical fiber of claim 1, wherein said plurality of cladding features include a first plurality of larger size features separated from each other by a distance, $s_1$, and a second plurality of smaller size features separated from each other by a distance $s_2$.

19. The optical fiber of claim 18, wherein said distance, $s_1$ is approximately equal to said distance $s_2$.

20. The optical fiber of claim 18, wherein said $s_1 > s_2$.

21. An optical fiber for propagating a single optical mode, said optical fiber comprising:

a cladding region comprising a plurality of cladding features disposed in a matrix, said plurality of cladding features having an average spacing, $\Lambda$, and an average size, d; and a core region surrounded by said cladding region, said plurality of cladding features substantially confining propagation of said single optical mode to said core region, said plurality of cladding features having (i) sufficient average spacing, $\Lambda$, to provide an increased effective core size, $2\rho$, (ii) a sufficient average size, d, to provide substantial confinement of light within said core region and (iii) and an average number of rows to provide single mode propagation, wherein said average size, d, and said average spacing, $\Lambda$, have values at least about 20 micrometers to provide an effective core size of at least about 20 micrometers, and said average number of rows N has a value of 1.

22. The optical fiber of claim 21, wherein said average size, d, and said average spacing, $\Lambda$, have values of at least about 30 micrometers.

23. The optical fiber of claim 21, wherein said average size, d, and said average spacing, $\Lambda$, have values of at least about 40 micrometers.

24. The optical fiber of claim 21, wherein said effective core size is at least about 30 micrometers.

25. The optical fiber of claim 21, wherein said effective core size is at least about 40 micrometers.

26. The optical fiber of claim 21, wherein said effective core size is at least about 60 micrometers.

27. The optical fiber of claim 21, wherein said effective core size is at least about 80 micrometers.

28. The optical fiber of claim 21, wherein said core region is hollow.

29. The optical fiber of claim 21, wherein said cladding region includes a first and second set of cladding features, said first set of cladding features arranged to support propagation of a single mode and said second set of cladding features arranged to support propagation of multiple modes for pump propagation.

30. The optical fiber of claim 29, wherein said cladding features in said second set are larger than said cladding features in said first set.

31. The optical fiber of claim 21, wherein said plurality of cladding features have two-fold symmetry so as to maintain polarization of light propagating through said core region.

32. The optical fiber of claim 21, wherein the V number is greater than about 2.4.

33. The optical fiber of claim 21, further comprising dopants that provide gain.

34. An optical fiber for propagating a single mode, said optical fiber comprising:

a cladding region comprising a plurality of cladding features disposed in a matrix, said plurality of cladding features having an average spacing, $\Lambda$, and an average size, d; and a core region surrounded by said cladding region, said plurality of cladding features substantially confining propagation of said single optical mode to said core region, said plurality of cladding features having (i) sufficient average spacing, $\Lambda$, to provide an increased effective core size, $2\rho$ and (ii) a sufficient average size, d, to provide substantial confinement of light within said core region, wherein said average size, d, and said average spacing, $\Lambda$, have respective values to provide an increased effective core size of at least about 80 microns, said fiber capable of propagating single mode.

35. An optical fiber for propagating a single optical mode, said optical fiber comprising:
- a cladding region comprising a plurality of cladding features disposed in a matrix, said plurality of cladding features having an average spacing, $\Lambda$, and an average size, d, and a core region surrounded by said cladding region, said plurality of cladding features substantially confining propagation of said single optical mode to said core region, said plurality of cladding features having (i) sufficient average spacing, $\Lambda$, to provide an increased effective core size, $2\rho$, (ii) a sufficient average size, d, to provide substantial confinement of light within said core region, and (iii) an average number of rows to provide single mode propagation,
- wherein said average size, d, is substantially equal to said average spacing, $\Lambda$ and said average number of rows, N, has a value less than or equal to about 2.

36. The optical fiber of claim 35, wherein the difference between said average size, d, and said average spacing, $\Lambda$, is less than or equal to about 15% of average spacing, $\Lambda$.

37. The optical fiber of claim 35, wherein the difference between said average size, d, and said average spacing, $\Lambda$, is less than or equal to about 10% of average spacing, $\Lambda$.

38. The optical fiber of claim 35, wherein the difference between said average size, d, and said average spacing, $\Lambda$, is less than or equal to about 5% of average spacing, $\Lambda$.

39. The optical fiber of claim 35, wherein the V number is greater than about 2.4.

40. The optical fiber of claim 35, further comprising material for providing optical gain.

41. An optical fiber for propagating a single mode, said optical fiber comprising:
- a cladding region comprising a plurality of cladding features disposed in a matrix, said plurality of cladding features having an average spacing, $\Lambda$, and an average size, d; and
- a core region surrounded by said cladding region, said plurality of cladding features substantially confining propagation of said single mode to said core region, said plurality of cladding features having (i) sufficient average spacing, $\Lambda$, to provide an increased effective core size, $2\rho$, and (ii) a sufficient average size, d, to provide substantial confinement of light within said core region,
- wherein said average size, d, is greater than about 40 microns, and the difference between said average size, d, and said average spacing, $\Lambda$, is less than about 50% of said average spacing, $\Lambda$.

42. The optical fiber of claim 41, wherein the difference between said average size, d, and said average spacing, $\Lambda$, is less than about 30% of said average spacing, $\Lambda$.

43. The optical fiber of claim 41, wherein the V number is greater than about 2.4.

44. The optical fiber of claim 41, further comprising dopants for providing gain.

45. An optical fiber assembly comprising an optical fiber that supports a fundamental mode having a fundamental mode profile and a plurality of higher order modes having different mode profiles, said optical fiber assembly comprising:
- a cladding region comprising a plurality of cladding features disposed in a matrix;
- a core region surrounded by said cladding region, said plurality of cladding features substantially confining propagation of light to said core region, said core region being sufficiently large so as to support propagation of said fundamental optical mode and said plurality of higher order modes; and
- an optical coupler disposed with respect to said core region to couple light into said core region, said optical coupler configured to output light having an optical distribution substantially matching the mode profile of said fundamental mode, thereby coupling substantially more of said light into said signal mode of said fiber than said plurality of higher order modes,
- wherein the said cladding region and said core region yield an effective refractive index for each of said fundamental and higher order modes, said effective refractive index of said fundamental mode and said effective refractive index of said higher order modes having a difference that is larger than about 0.001 such that mode coupling between said fundamental mode and said higher order modes is substantially reduced.

46. The optical fiber of claim 34, wherein said plurality of cladding features have an average number of rows, N which is less than or equal to about 1, suitable to support propagation of said fundamental mode and suppress propagation of said plurality of higher order modes.

47. The optical fiber of claim 35, wherein said average number of rows N is less than or equal to about 1.

48. The optical fiber of claim 41, wherein said plurality of cladding features have an average number of rows, N which is less than or equal to about 1, suitable to support propagation of said fundamental mode and suppress propagation of said plurality of higher order modes.

49. The optical fiber of claim 45, wherein said plurality of cladding features have an average number of rows, N which is less than or equal to about 1, suitable to support propagation of said fundamental mode and suppress propagation of said plurality of higher order modes.

* * * * *